US012566810B2

(12) United States Patent
Kim et al.

(10) Patent No.: US 12,566,810 B2
(45) Date of Patent: Mar. 3, 2026

(54) ARTIFICIAL INTELLIGENCE DEVICE AND SMART HOME COOKING SYSTEM INCLUDING ARTIFICIAL INTELLIGENCE DEVICE

(71) Applicant: LG ELECTRONICS INC., Seoul (KR)

(72) Inventors: Eunsuk Kim, Seoul (KR); Hoyoung Choi, Seoul (KR); Taejung Kwon, Seoul (KR); Taegu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/836,301

(22) PCT Filed: Feb. 7, 2022

(86) PCT No.: PCT/KR2022/001862
§ 371 (c)(1),
(2) Date: Aug. 6, 2024

(87) PCT Pub. No.: WO2023/149592
PCT Pub. Date: Aug. 10, 2023

(65) Prior Publication Data
US 2025/0181657 A1    Jun. 5, 2025

(51) Int. Cl.
*G06F 16/9535*    (2019.01)
*F24C 7/08*       (2006.01)
*G06F 9/451*      (2018.01)
*G10L 15/22*      (2006.01)

(52) U.S. Cl.
CPC ............ *G06F 16/9535* (2019.01); *F24C 7/08* (2013.01); *G06F 9/451* (2018.02); *G10L 15/22* (2013.01)

(58) Field of Classification Search
CPC .......... G06Q 50/10; F24C 7/08; G06N 20/00; G06N 3/02; G10L 15/22; G06F 9/451; G06F 16/9535; H04L 12/28; A47J 36/32
See application file for complete search history.

(56) References Cited

U.S. PATENT DOCUMENTS

| | | | |
|---|---|---|---|
| 2019/0053332 A1 | 2/2019 | Cheng et al. | |
| 2019/0063988 A1* | 2/2019 | Wallace ................. | G01G 19/52 |
| 2020/0098466 A1* | 3/2020 | Murdoch .............. | G16H 20/60 |
| 2021/0150543 A1* | 5/2021 | Sodhi ..................... | G06Q 30/02 |
| 2021/0183494 A1* | 6/2021 | Xiao ...................... | G16H 10/60 |

(Continued)

*Primary Examiner* — Etienne P Leroux

(74) *Attorney, Agent, or Firm* — Birch, Stewart, Kolasch & Birch, LLP

(57) ABSTRACT

The present invention relates to a smart home cooking system using an artificial intelligence device, comprising: at least one cooking utensil provided to cook food ingredients; and the artificial intelligence device that is provided to identify a speech command of a user and control the cooking utensil to cook the food ingredients according to the identified speech command, learns a preferred food of the user and a preferred food type of the user according to a food cooking history of the user, detects, when there is a request of the user, at least one food recipe according to the preferred food of the user or the preferred type of the user from among a pre-stored plurality of recipes, on the basis of a result of the learning, and provides the detected at least one food recipe to the user as a recommended food recipe.

19 Claims, 11 Drawing Sheets

(56)                    References Cited

U.S. PATENT DOCUMENTS

| | | | | |
|---|---|---|---|---|
| 2022/0114404 | A1* | 4/2022 | Bhogal | .................. G06T 7/001 |
| 2022/0318740 | A1* | 10/2022 | Lee | ................... G06Q 10/0832 |
| 2022/0327909 | A1* | 10/2022 | Hahm | .................... H04L 12/28 |
| 2023/0102294 | A1* | 3/2023 | Karri | ...................... G05B 15/02 |
| | | | | 700/275 |

* cited by examiner

*FIG. 3*

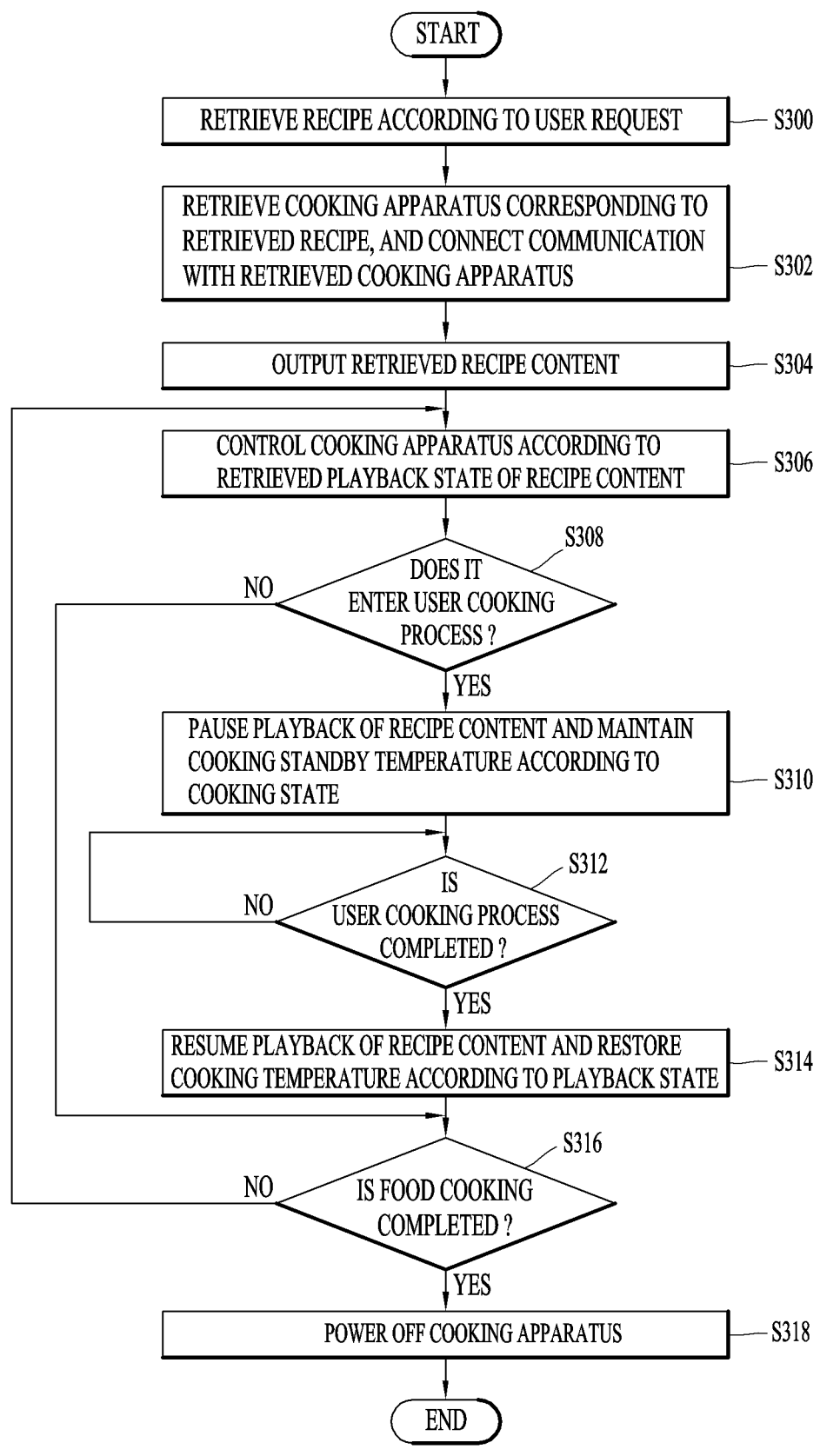

START

RETRIEVE RECIPE ACCORDING TO USER REQUEST — S300

RETRIEVE COOKING APPARATUS CORRESPONDING TO RETRIEVED RECIPE, AND CONNECT COMMUNICATION WITH RETRIEVED COOKING APPARATUS — S302

OUTPUT RETRIEVED RECIPE CONTENT — S304

CONTROL COOKING APPARATUS ACCORDING TO RETRIEVED PLAYBACK STATE OF RECIPE CONTENT — S306

DOES IT ENTER USER COOKING PROCESS ? — S308
NO
YES

PAUSE PLAYBACK OF RECIPE CONTENT AND MAINTAIN COOKING STANDBY TEMPERATURE ACCORDING TO COOKING STATE — S310

IS USER COOKING PROCESS COMPLETED ? — S312
NO
YES

RESUME PLAYBACK OF RECIPE CONTENT AND RESTORE COOKING TEMPERATURE ACCORDING TO PLAYBACK STATE — S314

IS FOOD COOKING COMPLETED ? — S316
NO
YES

POWER OFF COOKING APPARATUS — S318

END

FIG. 6

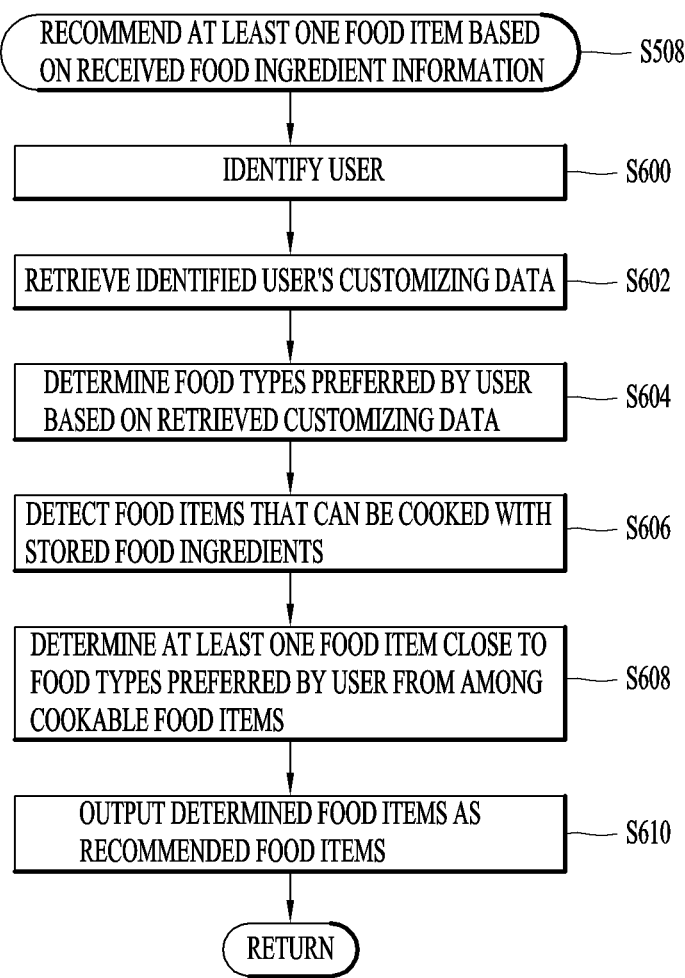

RECOMMEND AT LEAST ONE FOOD ITEM BASED ON RECEIVED FOOD INGREDIENT INFORMATION — S508

IDENTIFY USER — S600

RETRIEVE IDENTIFIED USER'S CUSTOMIZING DATA — S602

DETERMINE FOOD TYPES PREFERRED BY USER BASED ON RETRIEVED CUSTOMIZING DATA — S604

DETECT FOOD ITEMS THAT CAN BE COOKED WITH STORED FOOD INGREDIENTS — S606

DETERMINE AT LEAST ONE FOOD ITEM CLOSE TO FOOD TYPES PREFERRED BY USER FROM AMONG COOKABLE FOOD ITEMS — S608

OUTPUT DETERMINED FOOD ITEMS AS RECOMMENDED FOOD ITEMS — S610

RETURN

FIG. 7

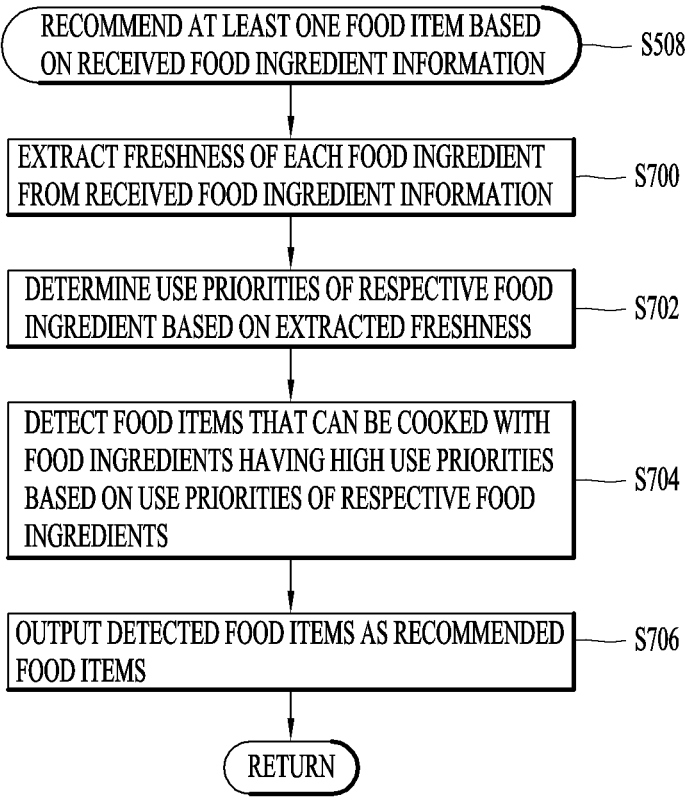

RECOMMEND AT LEAST ONE FOOD ITEM BASED ON RECEIVED FOOD INGREDIENT INFORMATION —— S508

EXTRACT FRESHNESS OF EACH FOOD INGREDIENT FROM RECEIVED FOOD INGREDIENT INFORMATION —— S700

DETERMINE USE PRIORITIES OF RESPECTIVE FOOD INGREDIENT BASED ON EXTRACTED FRESHNESS —— S702

DETECT FOOD ITEMS THAT CAN BE COOKED WITH FOOD INGREDIENTS HAVING HIGH USE PRIORITIES BASED ON USE PRIORITIES OF RESPECTIVE FOOD INGREDIENTS —— S704

OUTPUT DETECTED FOOD ITEMS AS RECOMMENDED FOOD ITEMS —— S706

RETURN

ARTIFICIAL INTELLIGENCE DEVICE AND SMART HOME COOKING SYSTEM INCLUDING ARTIFICIAL INTELLIGENCE DEVICE

CROSS-REFERENCE TO RELATED APPLICATION

This application is the National Phase of PCT International Application No. PCT/KR2022/001862, filed on Feb. 7, 2022, which is hereby expressly incorporated by reference into the present application.

TECHNICAL FIELD

The present disclosure relates to a smart home cooking system using an artificial intelligence device.

BACKGROUND ART

At present, due to the development of communication technology, an Internet of Things (IoT) function that connects various apparatuses to one another through communication is being implemented. Moreover, with the development of communication technology, artificial intelligence (AI) technology, which allows an apparatus to learn on its own and provides a result based on the learning, has emerged, and a smart home system in which various home appliances are connected through a device provided with an artificial intelligence function, that is, an artificial intelligence device, has appeared.

Such a smart home system refers to a technology that monitors and controls apparatuses in various fields ranging from a home appliance such as a TV, an air conditioner, or a refrigerator to an energy-consuming device such as water, electricity, air conditioning and heating, as well as a security apparatus such as a door lock and a surveillance camera (CCTV) by connecting the artificial intelligence device to a communication network. In this case, the artificial intelligence device may increase a user's convenience by learning the user's situation and the user's taste and providing a result according to the user's situation and request based on the learned result.

Meanwhile, there arise social needs for a smart home cooking system that can support a user to more conveniently cook food according to the user's current situation or food according to the user's taste through applying the smart home system to food cooking.

DISCLOSURE OF INVENTION

Technical Problem

The present disclosure aims to solve the foregoing and other problems, and an aspect of the present disclosure is to provide a smart home cooking system that can more efficiently support a user's food cooking through applying a smart home system to food cooking.

In addition, an aspect of the present disclosure is to provide an artificial intelligence device of the smart home cooking system that can recommend food items that a user may prefer based on the user's taste or current situation according to a learning result, provide a recipe to allow the user to cook the recommended food item, and control at least one cooking apparatus connected through the smart home cooking system according to the recipe, and a method of controlling the artificial intelligence device.

Solution to Problem

In order to achieve the foregoing and other objectives, according to an aspect of the present disclosure, there is provided a smart home cooking system according to an embodiment of the present disclosure, and the system may include at least one cooking apparatus configured to cook food ingredients, and an artificial intelligence device configured to identify a user's voice command and control the cooking apparatus to cook food ingredients according to the identified voice command, learn the user's preference food items and the user's preference food types according to the user's food cooking history, and detect, when there is a request from the user, at least one food recipe according to the user's preferred food items or the user's preference types from among a plurality of pre-stored recipes based on the learned result, and provide the detected at least one food recipe as a recommended food recipe to the user.

According to one embodiment, the artificial intelligence device may detect at least one food item cooked at a preset frequency or higher according to the user's food cooking history to learn the user's preferred food item, and learn the user's preferred food type based on the kinds and ingredients of the food item cooked at the preset frequency or higher.

According to one embodiment, the smart home cooking system may further include a storage apparatus that stores the food ingredients, wherein the artificial intelligence device establishes a communication connection to the storage apparatus, and detects at least one of the plurality of recipes by further reflecting food ingredient information received from the storage apparatus through the communication connection, and provides the detected at least one recipe as the recommended food recipe to the user.

According to one embodiment, the food ingredient information may include the remaining amount information of food ingredients contained in the storage apparatus, wherein the artificial intelligence device extracts cookable food items from among food items corresponding to the plurality of recipes based on the remaining amount information of the food ingredients, and provides the recipe of at least one of the extracted food items as the recommended food recipe to the user.

According to one embodiment, the artificial intelligence device may extract the cookable food items based on the food ingredients when the food ingredients are stored in the storage apparatus above predetermined amounts, wherein the predetermined amounts are determined according to an amount of food learned according to the user's food cooking history.

According to one embodiment, the storage apparatus may further include a sensor that detects the ripening state or freshness of the food ingredients, and transmit food ingredient information including the ripening state or freshness of the food ingredients according to the detection result of the sensor to the artificial intelligence device.

According to one embodiment, the artificial intelligence device may set, depending on the kinds of stored food ingredients, different use priorities corresponding to the ripening state or freshness of the food ingredients included in the ingredient information, detect at least one of the plurality of recipes based on the use priorities, and provide the detected at least one recipe as the recommended food recipe.

According to one embodiment, the artificial intelligence device may notify the user of notification information that the remaining amounts of the food ingredients are insufficient when the remaining amount information of the food ingredients is below preset minimum reserve amounts, and proceed with, when a selection is made by the user, a purchase process for purchasing the food ingredients.

According to one embodiment, the artificial intelligence device may calculate average consumption amounts according to use frequencies of the food ingredients during a preset period, and calculate the minimum reserve amounts by adding preset margin values to the calculated average consumption amounts.

According to one embodiment, the artificial intelligence device may detect preference food ingredients preferred by the user according to frequencies of use from among food ingredients stored in the storage apparatus, and discriminate whether there are shortages by comparing the remaining amounts and the minimum reserve amounts only for the detected preference food ingredients.

According to one embodiment, the artificial intelligence device may include a communication part that performs a communication connection to the at least one cooking apparatus, a memory that stores the plurality of recipes stored in a reproducible form, customizing data including the user's preference food items and the user's preference food types learned according to the user's food cooking history, and control information for controlling the cooking apparatus, an input part including a microphone for receiving the user's voice command, a display that outputs any one recipe selected from among the plurality of recipes, an artificial intelligence part that learns the user's preference food items and the user's preference food types according to the user's food cooking history, and a controller that retrieves any one of the plurality of recipes based on the user's customizing data identified through the voice command, controls the display to play back the retrieved recipe, and transmits a control signal according to the playback state of the recipe to the cooking apparatus to control the cooking apparatus so as to cook food according to the playback state of the recipe.

According to one embodiment, the controller, while playing back the recipe, may pause the playback of the recipe when a process requiring the user's own cooking is played back, and lower a heating power level at which the food is heated by the cooking apparatus so as to maintain a cooking standby temperature according to the cooking state of the food until the user's own cooking is completed.

According to one embodiment, the cooking standby temperature may be a temperature lower than the temperature at which the food is cooked by a preset level or more, wherein the heating power level lowered for the cooking standby temperature increases as the temperature at which the food is cooked increases.

According to one embodiment, the controller, while playing back the recipe, may detect a user's request for the playback of additional content related to the user's own cooking when a process requiring the user's own cooking is played back, and play back, when there is a request from the user, the additional content on at least part of the display while maintaining the playback of the recipe in a paused state.

According to one embodiment, the controller may display a graphic object corresponding to the additional content in an area on the display when the playback of the recipe is in a paused state, and determine that there is the user's request for the playback of the additional content when the user's input is applied to the graphic object.

According to one embodiment, the controller may discriminate whether the process requiring the user's own cooking has been completed through a conversational interaction with the user, and subsequently play back the paused recipe when the process requiring the user's own cooking is completed, and restore the heating power level of the cooking apparatus controlled according to the cooking standby temperature.

According to one embodiment, the recipe may be video content or slide-type content in which images showing cooking details for each process of cooking food are sequentially output one by one as a time period designated for each image elapses.

According to one embodiment, the communication part may further include an Internet module that performs a communication connection to a preset external server, wherein the controller retrieves a recipe according to the user's request from the external server, and adds the retrieved recipe to a plurality of pre-stored recipes.

In order to achieve the foregoing and other objectives, according to an aspect of the present disclosure, there is provided a method of controlling an artificial intelligence device provided in a smart home cooking system, and the method may include retrieving a recipe according to a user's request from among a plurality of recipes stored in a reproducible form, connecting communication with any one cooking apparatus capable of cooking food according to the retrieved recipe from among at least one cooking apparatus included in the smart home cooking system, playing back the retrieved recipe, controlling the communication-connected cooking apparatus to cook the food according to the playback state of the recipe, pausing, while playing back the recipe, the playback of the recipe when a process requiring the user's own cooking is played back, and lowering a heating power level at which the food is heated by the cooking apparatus so as to maintain a cooking standby temperature according to the cooking state of the food until the user's own cooking is completed, and subsequently playing back the paused recipe when the process requiring the user's own cooking is completed, and restoring the heating power level of the cooking apparatus controlled according to the cooking standby temperature, wherein whether the process requiring the user's own cooking is completed is discriminated through a conversational interaction with the user.

According to one embodiment, the recipe according to the user's request may be a recipe for at least one food item determined based on the user's preference food items and the user's preference food types learned according to the user's food cooking history.

Advantageous Effects of Invention

A smart home cooking system including an artificial intelligence device and a method of controlling the artificial intelligence device according to the present disclosure will be described as follows.

According to at least one of embodiments of the present disclosure, the present disclosure may allow the artificial intelligence device of the smart home cooking system to provide a recipe related to a food item selected by a user as video content, and to control a cooking apparatus that cooks the selected food item according to the playback state of the video content. Therefore, there is an effect that the selected food item can be cooked by simply dropping cooking ingredients according to the recipe provided in the video without the user having to control the cooking apparatus on his or her own.

In addition, in the present disclosure, the artificial intelligence device of the smart home cooking system may recommend suitable food according to a result of learning the user's taste, the user's current situation, or a state of food ingredients, and provide a recipe for the recommended food. Moreover, at least one cooking apparatus may be controlled according to the provided recipe, thereby having an effect of allowing the user to more easily cook food that is suitable for the user's taste or the user's situation.

BRIEF DESCRIPTION OF DRAWINGS

FIG. 3 is a flowchart showing an operation process of supporting, by the artificial intelligence device as shown in FIG. 2, the cooking of food according to a user's request.

FIG. 6 is a flowchart showing an operation process of recommending at least one food item to a user according to a result of learning the user's taste during the operation processes of FIG. 5.

FIG. 7 is a flowchart showing an operation process of recommending at least one food item to a user according to the freshness of stored food ingredients during the operation processes of FIG. 5.

MODE FOR THE INVENTION

It should be noted that technical terms used herein are merely used to describe specific embodiments, and are not intended to limit the present disclosure. In addition, a singular expression used herein may include a plural expression unless clearly defined otherwise in the context. A suffix "module" or "part" used for elements disclosed in the following description is merely intended for easy description of the specification, and the suffix itself is not intended to have any special meaning or function.

As used herein, terms such as "comprise" or "include" should not be construed to necessarily include all elements or steps described herein, and should be construed not to include some elements or some steps thereof, or should be construed to further include additional elements or steps.

In addition, in describing technologies disclosed herein, when it is determined that a detailed description of known technologies related thereto may unnecessarily obscure the subject matter disclosed herein, the detailed description will be omitted.

Furthermore, the accompanying drawings are provided only for a better understanding of the embodiments disclosed herein and are not intended to limit technical concepts disclosed herein, and therefore, it should be understood that the accompanying drawings include all modifications, equivalents and substitutes within the concept and technical scope of the present disclosure. In addition, not only individual embodiments described below but also a combination of the embodiments may, of course, fall within the concept and technical scope of the present disclosure, as modifications, equivalents or substitutes included in the concept and technical scope of the present disclosure.

Figure 1:
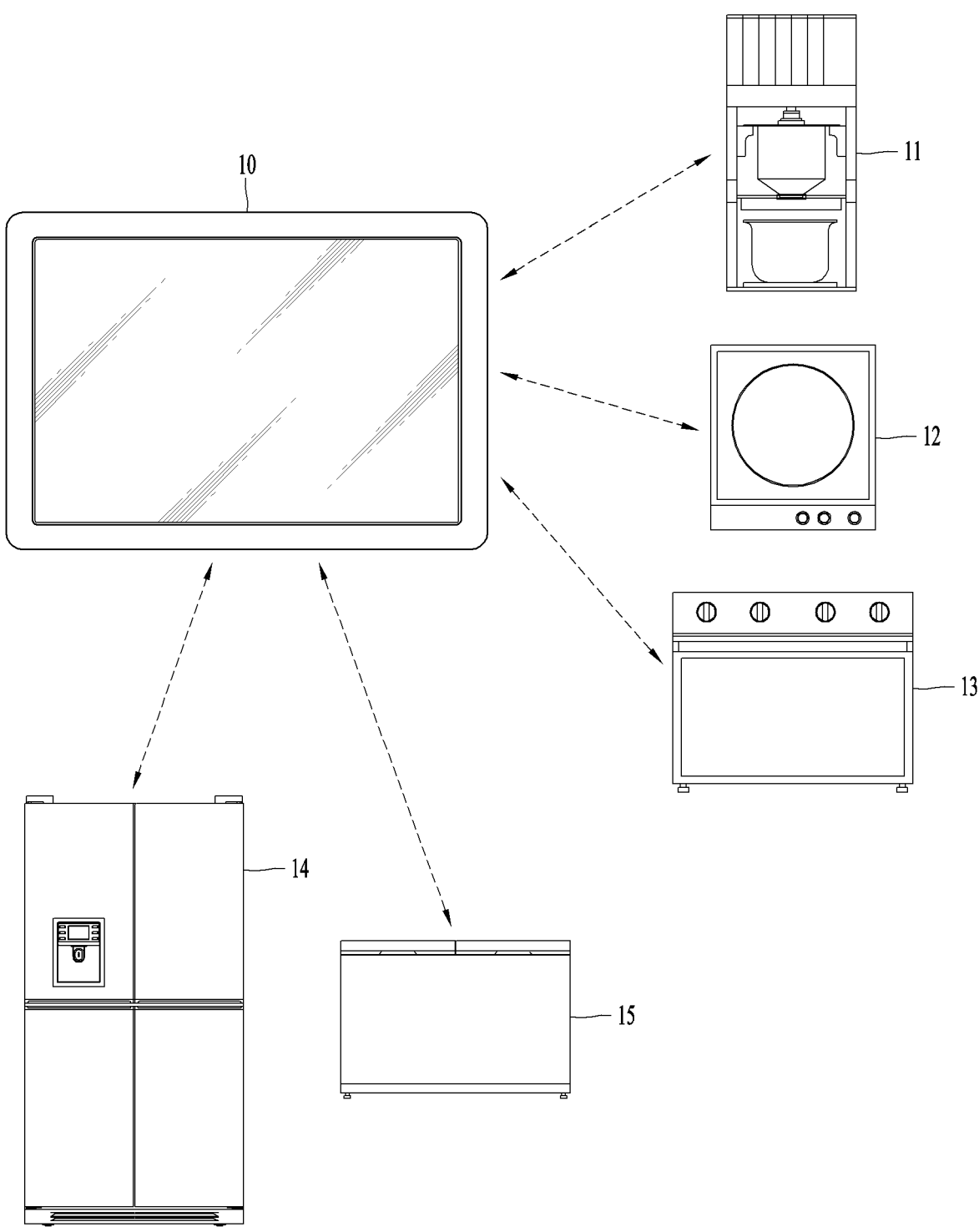
FIG. 1 is an exemplary view showing an example of a smart home cooking system according to an embodiment of the present disclosure.

FIG. 1 is an exemplary view showing an example of a smart home cooking system according to an embodiment of the present disclosure.

Referring to FIG. 1, a smart home cooking system according to an embodiment of the present disclosure may include an artificial intelligence device 10 and a plurality of electronic apparatuses 11, 12, 13, 14, 15 connected to the artificial intelligence device 10 through communication.

Here, some of the plurality of electronic apparatuses may be apparatuses for cooking food. For example, the plurality of electronic apparatuses may be apparatuses that can cook food by heating food ingredients, such as an induction cooker 12 or an oven 13. Alternatively, the plurality of electronic apparatuses may be apparatuses related to preparing ingredients for cooking food (rice), such as a grain dispenser 11. Hereinafter, an apparatus that directly cooks the food and an apparatus related to discharging ingredients for cooking the food will be referred to as an apparatus related to cooking food, that is, a cooking apparatus.

In addition, some of the plurality of electronic apparatuses may be storage apparatuses that store food ingredients. For example, the storage apparatus may be a refrigerator 14 or a food storage unit 15. Here, the food storage unit 15, which is an apparatus for storing food ingredients through freezing or refrigeration, may be a kimchi refrigerator for storing kimchi or a meat storage unit for storing meat or fish.

Meanwhile, the artificial intelligence device 10 may be connected to at least one cooking apparatus and at least one storage apparatus as described above. The artificial intelligence device 10 may be connected to the plurality of cooking apparatuses or storage apparatuses through a preset communication method.

As an example, the artificial intelligence device 10 may be wirelessly connected to the plurality of cooking apparatuses or storage apparatuses using preset short-range communication. Additionally, the artificial intelligence device 10 may perform wireless communication with a preset external server through a network, receive data from a preset external server, or perform retrieval through a connected network.

Meanwhile, the artificial intelligence device 10 may be provided with an artificial intelligence part that processes information through artificial intelligence technology. In order to process information requested by the user, the artificial intelligence part may be provided with a natural language processing (NLP) component for processing natural language. In addition, the NLP component may be used to understand and analyze voice information collected from the speaker, and discriminate information requested by the speaker through voice based on pre-stored information according to the analysis results. Accordingly, the artificial intelligence part may receive the user's voice command, and identify the user's request included in the received voice command.

In addition, the artificial intelligence part may perform learning based on information sensed from the user, such as surrounding environment information or the user's voice information, and process the identified user's request based on the performed learning. In this case, when there are a plurality of users, the artificial intelligence part may distinguish and identify the users, respectively. To this end, the artificial intelligence device 10 may be provided with a camera to identify the speaker who has uttered the voice command through the camera. Alternatively, the artificial intelligence part 180 may analyze the characteristics of the received voice and identify the speaker based on the analyzed voice characteristics (e.g., tone, intonation, pronunciation, etc.). Furthermore, various information related to the recognized user request from the identified speaker may be learned as 'personalized data' related to the user, that is, customizing data.

Here, the 'personalized data' learned by the artificial intelligence device 10 according to an embodiment of the present disclosure may include a set of data related to a request received from the user, such as the identified speaker's preferred food taste and preferred time of day for a specific food item. For example, the artificial intelligence part 180 may learn the user's preferred food taste based on the learning results of food items prepared according to the user's request. Additionally, based on a time of day at which the user's request for cooking a specific food item is received, information on the user's preferred time for cooking the specific food item may be learned. Additionally, information on the user's preferred amount of food may be learned based on an amount of the food item requested by the user. Furthermore, the learning data may be stored as personalized data corresponding to the identified speaker.

In addition, the artificial intelligence device 10 may store various control information for controlling at least one connected apparatus. Accordingly, the artificial intelligence device 10 may determine an operation of at least one of the connected apparatuses based on an information processing result by the artificial intelligence part 180, and control the connected at least one apparatus to execute the determined operation based on control information corresponding to the determined operation.

Figure 2:
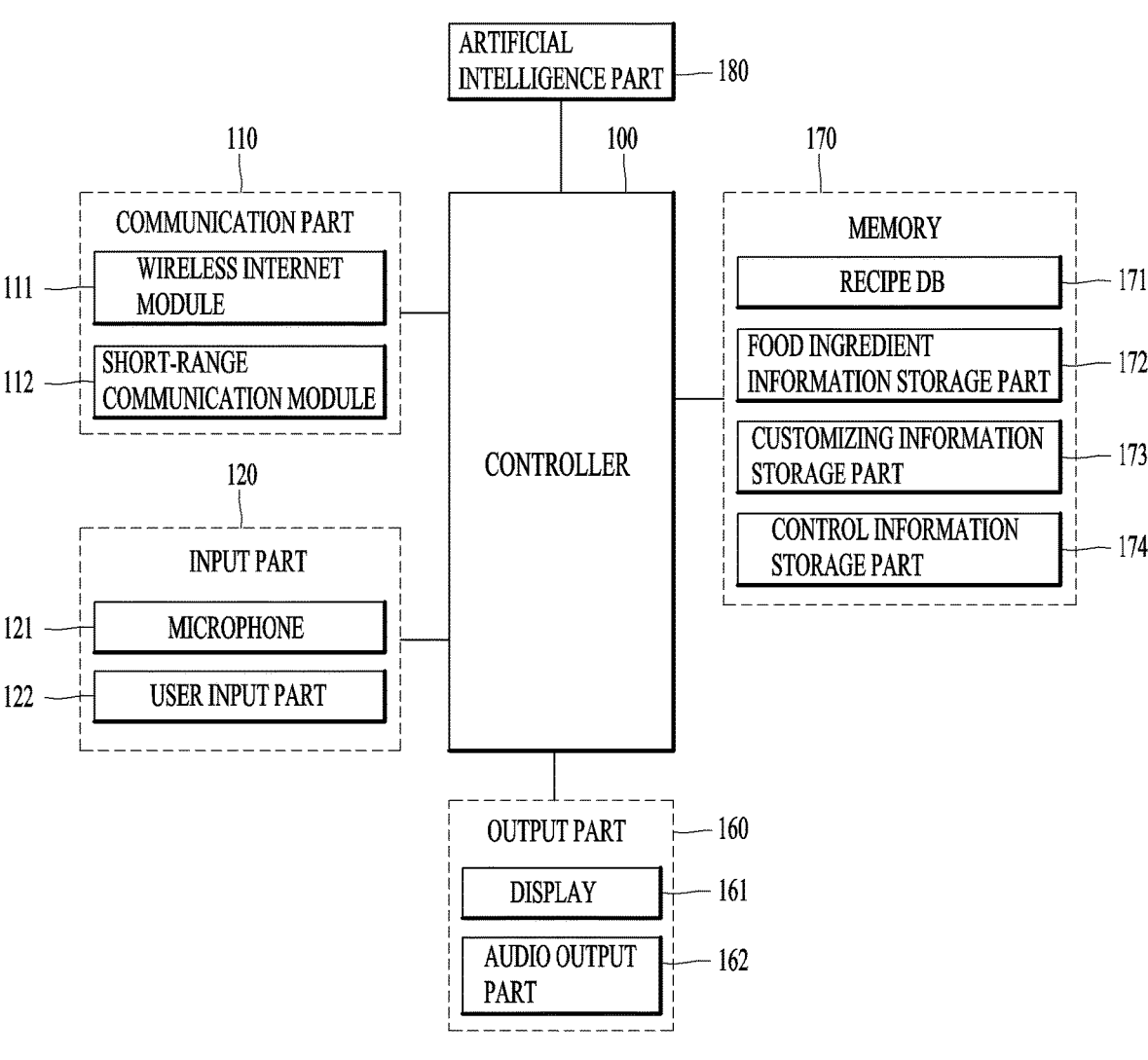
FIG. 2 is a block diagram showing a structure of an artificial intelligence device in a smart home cooking system according to an embodiment of the present disclosure.

FIG. 2 is a block diagram showing a structure of the artificial intelligence device 10 in a smart home cooking system according to an embodiment of the present disclosure.

Referring to FIG. 2, the artificial intelligence device 10 according an embodiment of the present disclosure may include a communication part 110, an input part 120, an output part 160, a memory 170, a controller 100, and an artificial intelligence part 180. The elements shown in FIG. 2 are not essential for implementing the artificial intelligence device 10, and thus the artificial intelligence device 10 described herein may have more or fewer element than those listed above.

More specifically, among the foregoing elements, the communication part 110 may include one or more modules that allow wireless communication between the artificial intelligence device 10 and a plurality of other electronic apparatuses, or between the artificial intelligence device 10 and an external server. In addition, the communication part 110 may include one or more modules for connecting the artificial intelligence device 10 to one or more networks.

The communication part 110 may include at least one of a wireless Internet module 111, and a short-range communication module 112.

First, the wireless Internet module 111 refers to a module for wireless Internet access, and may be internally or externally coupled to the artificial intelligence device 10. The wireless Internet module 111 may transmit and receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 111 may transmit/receive data according to at least one wireless Internet technology within a range including even Internet technologies which are not aforementioned.

Furthermore, the short-range communication module 112 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 112 may support wireless communication between the artificial intelligence device 10 and a wireless communication system, or between the artificial intelligence device 10 and other apparatuses through short-range wireless area networks.

The input part 120 may include a microphone 121 for receiving an audio signal, and a user input part 122 including various keys for receiving information from the user. Voice data collected by the input part 120 or key data received through the user input part 122 may be analyzed and processed as the user's control command.

The output part 160 is used to generate an output related to visual, auditory, or tactile senses, and may include at least one of a display 161 and an audio output part 162.

The display 161 may display (output) various information processed in the artificial intelligence device 10. For example, the display 161 may display execution screen information of an application program driven in the artificial intelligence device 10 or user interface (UI) and graphic user interface (GUI) information in response to the execution screen information.

Meanwhile, the display 161 may have an inter-layered structure or an integrated structure with a touch sensor in order to implement a touch screen. The touch screen may provide an output interface between the artificial intelligence device 10 and the user, as well as function as the user input part 121 that provides an input interface between the artificial intelligence device 10 and the user.

The audio output part 162 may output various audio data received from the communication part 110 or stored in the memory 170. The audio output part 162 may also provide an audio signal associated with a function (e.g., video recipe playback, recipe guide) performed by the artificial intelligence device 10. The audio output part 162 may include a receiver, a speaker, a buzzer or the like.

In addition, the memory 170 may temporarily store data supporting various functions of the artificial intelligence device 10 and input/output data. The memory 170 may store a plurality of application programs (or applications) executed in the artificial intelligence device 10, data for the operation of the artificial intelligence device 10, commands, and data for the operation of the artificial intelligence part 180 (e.g., at least one algorithm information for machine learning, etc.). Additionally, control information that can drive other connected electronic apparatuses and control functions executed in the other connected electronic apparatuses may be stored.

At least some of those application programs, control information and data may be downloaded from an external server via wireless communication. In addition, at least some of those applications may be present on the artificial intelligence device 10 from the time of shipment for the basic functions of the artificial intelligence device 10. Meanwhile, the application programs may be stored in the memory 170, installed in the artificial intelligence device 10, and executed by the controller 100 to perform an operation (or function) of the artificial intelligence device 10.

Meanwhile, the memory 170 may store recipe information related to a plurality of food items. The recipe information may be video content including visual and auditory information on a cooking process of the corresponding food item. The recipe information is classified and stored according to preset classification criteria, such as a kind (stew, soup, stir-fry, etc.) or food ingredient (beef, pork, fish, etc.) of the corresponding food item to form a database (recipe database 171). The recipe database 171 may be provided in the memory 170 from the time of shipment of the artificial intelligence device 10, and may be configured to further include recipe information received from an external server connected through a network.

Additionally, the memory 170 may store data received from other electronic apparatuses connected to the artificial intelligence device 10. As an example, the memory 170, when a storage apparatus such as a refrigerator 14 or a kimchi refrigerator 15 is connected thereto, may store data related to food ingredients provided from the connected storage apparatus. The food ingredient data may be stored in a preset area of the memory 170, and may include information on the freshness of food ingredients detected in respective storage apparatuses and the remaining amounts of respective food ingredients. Hereinafter, an area on the memory 170 in which information related to the food ingredients is stored will be referred to as a food ingredient information storage part 172.

Meanwhile, according to the foregoing description, it has been mentioned that the artificial intelligence part 180 according to an embodiment of the present disclosure may store a series of information related to the identified user's request as personalized data that is learning data for learning about the identified speaker. Accordingly, the memory 170 may store personalized data, that is, customizing data, in a preset area (customizing information storage part 173).

In addition, according to the foregoing description, it has been mentioned that the artificial intelligence device 10 according to an embodiment of the present disclosure may be connected to a plurality of electronic apparatuses, including a plurality of cooking apparatuses and storage apparatuses, and may control the plurality of connected electronic apparatuses. To this end, the artificial intelligence device 10 according to an embodiment of the present disclosure may identify other connected electronic apparatuses, and receive control information to control the identified electronic apparatuses from the identified electronic apparatuses or a preset external server. Furthermore, the received control information may be stored in a preset area on the memory 170. Alternatively, control information related to some electronic apparatuses may already be stored in the memory 170 at the time of shipment of the artificial intelligence part 180. Hereinafter, an area of the memory 170 in which control information for controlling the plurality of different electronic apparatuses is stored will be referred to as a control information storage part 174.

Meanwhile, the artificial intelligence part 180, which performs a role of processing information based on an artificial intelligence technology, may include at least one module that performs at least one of learning of information, inference of information, perception of information, and processing of a natural language.

The artificial intelligence part 180 may perform at least one of learning, inferring, and processing a vast amount of information (big data), such as information stored in the memory 170, environment information around the artificial intelligence device 10, and information stored in a communicable external storage using a machine learning technology. Furthermore, the artificial intelligence part 180 may control the artificial intelligence device 10 to predict (or infer) at least one executable function of the artificial intelligence device 10, and execute a most feasible function from among the at least one predicted function using information that is learned using the machine learning technology.

Meanwhile, the machine learning technology is a technology that collects and learns a large amount of information based on at least one algorithm, and determines and predicts information on the basis of the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using the artificial neural network algorithm. The artificial neural network may have a structure of linking layers and transferring data between the layers. This deep learning technology may be employed to learn vast amounts of information through the artificial neural network using a graphic processing unit (GPU) optimized for parallel computing.

Meanwhile, the artificial intelligence part 180 may collect (sense, monitor, extract, detect, receive) signals, data and information input or output among components of the artificial intelligence device 10, in order to collect vast amounts of information for applying the machine learning technology. Also, the artificial intelligence part 180 may collect (sense, monitor, extract, detect, receive) data, information and the like stored in an external storage (for example, a cloud server) connected through communication. More specifically, the collection of information may be understood as a term including an operation of sensing information through a sensor, extracting information stored in the memory 160, or receiving information from an external storage through communication.

The artificial intelligence part 180 may recognize a user request identified from the user's voice through the input part 120. In addition, the artificial intelligence part 180 may receive wireless signals, wireless data, and the like through the wireless communication part 110. The artificial intelligence part 180 may collect vast amounts of information in real time in a background, learn the collected information, process the learned information into an appropriate form of information (e.g., knowledge graph, command policy, personalization database, dialog engine, etc.), and store the processed information in the memory 170.

Furthermore, the artificial intelligence part 180 may control the elements of the artificial intelligence device 10 or transmit a control command for executing a predicted operation to the controller 100 on the basis of information learned using machine learning technology. The controller 100 may control the communication part 110 of the artificial intelligence device 10 based on a control command, thereby controlling at least one connected cooking apparatus to execute an operation related to cooking according to a result of recognizing the user's request according to the learned result.

Meanwhile, when the user's specific operation or request is detected, the artificial intelligence part 180 may analyze history information related to the specific operation or request through the machine learning technology, and perform updating of previously-learned information based on the analysis information. Accordingly, the artificial intelligence part 180 may improve the accuracy of information prediction.

Meanwhile, in this specification, the artificial intelligence part 180 and the controller 100 may be understood as the same component. In this instance, functions executed in the controller 100 described herein may be expressed as being executed in the artificial intelligence part 180, and the controller 100 may be named as the artificial intelligence part 180, or conversely the artificial intelligence part 180 may be referred to as the controller 100.

On the other hand, in this specification, the artificial intelligence part 180 and the controller 100 may be understood as separate elements. In this case, the artificial intelligence part 180 and the controller 100 may perform various controls on the artificial intelligence device 10 through data exchange with each other. The controller 100 may perform at least one function on the artificial intelligence device 10, or control at least one of the elements of the artificial intelligence device 10, based on a result derived from the artificial intelligence part 180. Furthermore, the artificial intelligence part 180 may also be operated under the control of the controller 100.

Meanwhile, the controller 100 may typically control an overall operation of the artificial intelligence device 10 in addition to the operations associated with the artificial intelligence part 180. The controller 100 may provide or process information or functions appropriate for a user in a manner of processing signals, data, information and the like, which are input or output through the above-described elements, or activating the application programs stored in the memory 170.

Furthermore, the controller 100 may control at least part of the elements illustrated in FIG. 2, to execute an application program stored in the memory 170. Moreover, the controller 100 may operate at least two of the elements included in the artificial intelligence device 10 in combination with each other in order to execute the application program.

Various embodiments described herein may be implemented in a computer-readable or its similar medium using, for example, software, hardware, or any combination thereof.

Hereinafter, embodiments related to an operation process of the artificial intelligence device 10 that can be implemented in a smart home cooking system including the artificial intelligence device 10 having the foregoing configuration will be described with reference to the accompanying drawings. It is obvious to those skilled in the art that the present disclosure can be embodied in other specific forms without departing from the concept and essential characteristics thereof.

FIG. 3 is a flowchart showing an operation process of supporting, by the artificial intelligence device as shown in FIG. 2, the cooking of food according to a user's request.

Referring to FIG. 3, first, when a user's voice command is received, the controller 100 of the artificial intelligence device 10 according to an embodiment of the present disclosure may identify the received voice command through natural language processing (NLP), and identify the user's request through a dialog method using the natural language processing. Furthermore, a food item according to the identified user's request may be determined from the identified user's request, Furthermore, a recipe for the determined food item may be retrieved (S400).

As an example, in the step S400, when the received user's voice command includes information on the name of a specific food item, the controller 100 may retrieve a recipe for the food item included in the identified voice command. However, when information on the name of a specific food item is not included in the voice command, the controller 100 may determine the food item requested by the user based on the user's pre-learned data identified through the voice command, that is, customizing data, and retrieve a recipe of the determined food item.

Meanwhile, in the step S400, when a recipe for the food item requested by the user through the voice command is not included in the recipe database 171, the controller 100 may retrieve a recipe for the food item requested by the user through a network. For example, the controller 100 may access a preset external server, and retrieve a recipe for the food item requested by the user through the external server. Furthermore, the retrieved recipe may be added to the recipe database 171.

Meanwhile, the controller 100 may detect a cooking apparatus for cooking a food item according to the user's request, based on the recipe retrieved in the step S400. Furthermore, a communication connection to the detected cooking apparatus may be performed (S302).

For example, based on the retrieved recipe, the controller 100 may discriminate whether the food item corresponding to the retrieved recipe is cooked through an oven or cooked through an induction cooker. In this case, the controller 100 may determine the cooking apparatus based on a kind of the food item or information on the cooking apparatus included in the recipe. Alternatively, the cooking apparatus may be determined based on a processing result of the artificial intelligence part 180 that has analyzed the retrieved recipe.

In this case, when there are a plurality of cooking apparatuses capable of cooking, the controller 100 may allow the user to select which cooking apparatus to use to cook the food item. Alternatively, the controller 100 may select any one cooking apparatus based on the operating states of the plurality of cooking apparatuses. For example, as a result of performing a communication connection to all of the plurality of cooking apparatuses, when only one is connected through communication (i.e., when the control of one cooking apparatus is not allowed), the controller 100 may select only one cooking apparatus to which the communication connection is allowed. Alternatively, as a result of performing a communication connection to all of the plurality of cooking apparatuses, when one of the cooking apparatuses is already in operation (i.e., when another food item is being cooked), another cooking apparatus capable of cooking may be selected. In this case, a communication connection to the selected cooking apparatus may be maintained.

Meanwhile, when a cooking apparatus to cook food is selected, the controller 100 may output the retrieved recipe (S304). In this case, the recipe may be video content that shows a cooking process of a specific food item. Alternatively, the recipe is slide-type content in which images showing cooking details for each process of cooking food are sequentially output one by one as a time period designated for each image elapses. Hereinafter, a recipe provided in a video or slide type as described above will be referred to as recipe content.

In the step S304, when the recipe content is played back according to the output, the controller 100 may control the cooking apparatus retrieved in the step S302 such that the retrieved cooking apparatus cooks food ingredients according to the played-back cooking process of the recipe content (S306). For example, when a currently selected recipe is a recipe for a food item such as stew or soup, which heats a container while ingredients and water are dropped into the container, the controller 100 may operate an induction cooker in which the container is placed so as to heat the container according to a cooking process corresponding to the playback state of the recipe content.

To this end, prior to controlling the cooking apparatus in the step S306, through a communication connection to the cooking apparatus selected in the step S302, the controller 100 may check whether the cooking apparatus is in a state in which food can be cooked. As an example, in the case of a cooking apparatus with a sealed entrance, such as an oven, when the entrance is not sealed, it may be discriminated that the oven is in a state of being disallowed to cook based on information received from the oven, and notification information notifying the user that the cooking apparatus is currently in a state of being disallowed to cook may be output.

In addition, the controller 100 may check with the user whether to start cooking prior to controlling the cooking apparatus in the step S306. Furthermore, the cooking apparatus may be controlled to start cooking when there is a confirmation from the user, thereby preventing the cooking apparatus from operating prior to placing the container or dropping the ingredients and water.

Meanwhile, through the cooking apparatus control process in the step S306, the controller 100 of the artificial intelligence device 10 may control the cooking apparatus such that the cooking temperature is automatically adjusted according to a cooking process related to a specific food item. However, in the case of cooking the food item, there is a case where the user's own cooking is required, such as preparing or dropping ingredients added while cooking the food item. Accordingly, when playing back the recipe content of the food item according to the user's request, the artificial intelligence device 10 in a smart home cooking system according to an embodiment of the present disclosure may discriminate whether a cooking process requiring the user's own cooking has entered (S308).

As an example, the recipe content may be content that previously includes information on a time corresponding to the user's own cooking process. That is, the recipe content may be content that includes information on a specific time when the user's own cooking is required (e.g., tag information).

In this case, upon reaching a time designated by the tag information while playing back recipe content, the controller 100 may determine that a process requiring the user's own cooking has been entered. Furthermore, when a process requiring a user's own cooking, that is, a user cooking process, has been entered, notification information may be output to inform the user that the user's own cooking is required.

Alternatively, the controller 100 may determine whether a process requiring the user's own cooking has been entered based on an analysis result of the artificial intelligence part 180 for the played-back recipe content.

For example, the artificial intelligence part 180 may determine that a current cooking process has entered the user cooking process when a voice order requesting a user's operation, for example, voice information requesting the dropping of a specific ingredient or the preparation of an ingredient (e.g., a request to slice or cut an ingredient) is detected from the voice information of the played-back recipe content.

Alternatively, the artificial intelligence part 180 may determine that the user cooking process has been entered when the output recipe content is about a cooking process that is different from the cooking process of the cooking apparatus. For example, in case where the cooking apparatus is an induction cooker, when a cooking process different from the heating of the cooking apparatus is output, it may be determined that the current cooking process has entered the user cooking process.

To this end, the artificial intelligence part 180 may analyze video content or still images (slides) that are played back, and determine that a process of cutting or trimming an ingredient such as a carrot or radish, or a process of dropping an ingredient is a process requiring the user's own cooking. In this case, the artificial intelligence part 180 may be trained to recognize an image of slicing or cutting various ingredients or an image of dropping an ingredient into a container as a user cooking process that is different from a cooking process using a cooking apparatus.

Meanwhile, as a result of the discrimination in the step S308, when entering a user cooking process requiring the user's own cooking, the controller 100 may control the playback of recipe content through a conversational interaction with the user. To this end, the controller 100 may first temporarily stop the playback of the recipe content (a pause state), and maintain the cooking standby temperature determined according to the current cooking state of the food (S310).

As an example, the cooking standby temperature may be lower than a temperature at which food is currently cooked by a preset level or more. For example, when the temperature at which food is currently cooked is at heating power corresponding to a fifth level, the controller 100 may control the induction cooker to maintain a current cooking state at a third level of heating power, which is two levels lower than the heating power level at which the food is currently cooked. This is to lower the heating temperature so as to maintain the current cooking state during a time period required for the user's own cooking process, and to prevent the food being cooked from cooling below a predetermined temperature.

Accordingly, a temperature level lowered for the cooking standby temperature may be determined differently depending on the temperature at which the food is currently cooked. For example, the lowered temperature level may increase as the cooking temperature increases. That is, when the current cooking temperature is high above a determined level, the controller 100 may lower the heating power level by two levels from the current heating power level to prevent the food from burning or the soup from reducing too much during the user's own cooking process. On the contrary, when the current cooking temperature is low below a predetermined level, the controller 100 may maintain a minimum temperature at which the food does not cool down while the user's own cooking process is carried out. Therefore, the heating power level may be lowered by only one level compared to the current heating power level.

Meanwhile, the cooking standby temperature may be determined through a conversational interaction with the user. In this case, the controller 100 may inform the user of the lowered heating power level to maintain the cooking standby temperature through the audio output part 162, and maintain the lowered heating power level or change the heating power level through a conversation with the user.

Meanwhile, while the cooking standby temperature is maintained in the step S310, the controller 100 may check whether the user cooking process has been completed (S312). To this end, the controller 100 may inquire whether the user has completed the cooking process through a conversational interaction with the user, and may discriminate whether the user cooking process has been completed depending on the user's answer. Furthermore, when the user cooking process is completed as a result of the check in the step S312, the controller 100 may subsequently play back the recipe content, and control the cooking apparatus to restore a cooking temperature according to a current playback state of the recipe content (S314). Therefore, when the cooking apparatus is controlled to lower the heating power by 2 levels to maintain the cooking temperature in the step S310, the controller 100 may restore the heating power level by entering the step S312. Accordingly, the heating power level may rise again to the fifth level, and the recipe content may be subsequently played back.

Meanwhile, when the recipe content is subsequently played back and the heating power and cooking temperature are restored in the step S314, the controller 100 may determine whether the cooking of the food item retrieved in the step S300 has been completed (S316). For example, the controller 100 may determine that the cooking of the food is completed when all the recipe content is played back. Alternatively, when the completion of cooking food is confirmed by the user, the controller 100 may determine that the cooking of the food is completed.

Meanwhile, as a result of the discrimination in the step S316, when the cooking of the food is not completed, the controller 100 may proceed again to step S306 to perform a process of controlling the cooking apparatus according to the playback state of the recipe content again. Then, the controller 100 may proceed to step S308 to discriminate whether it has entered the user cooking process. In this case, when it is determined in the step S308 that it has not entered the user cooking process, the controller 100 may proceed again to the step S308 to perform a process of controlling the cooking apparatus according to the playback state of the recipe content again. Therefore, when the cooking of the food has not been completed, the cooking apparatus may be controlled according to the playback state of the recipe content, and when entering the user cooking process during cooking, a process of maintaining the cooking standby temperature until the user's own cooking is completed may be continuously repeated until the cooking of the food is completed.

Meanwhile, as a result of the discrimination in the step S316, when the cooking of the food is completed, the controller 100 may turn off the power of the cooking apparatus (S318). In this case, the controller 100 may discriminate whether the cooking apparatus can be powered off prior to turning off the power, and turn off the power of the cooking apparatus according to the determination result.

Here, whether the cooking apparatus can be powered off may be determined through a conversational interaction with the user. Therefore, if the user wants to cook additional food for the food currently being cooked even though all the recipe content has been played back, then the controller 100 may control the cooking apparatus according to the user's request to continue additional cooking. Furthermore, when additional cooking according to the user's request is completed, the controller 100 may turn off the power of the cooking apparatus.

Additionally, whether the cooking apparatus can be powered off may be determined depending on the state of the cooking apparatus. As an example, when a container is placed inside a cooking apparatus, the controller 100 may determine that the cooking apparatus cannot be powered off. Then, the controller 100 may request the user to discharge the container, and when the container is discharged, the controller 100 may turn off the power of the cooking apparatus.

Figure 4:
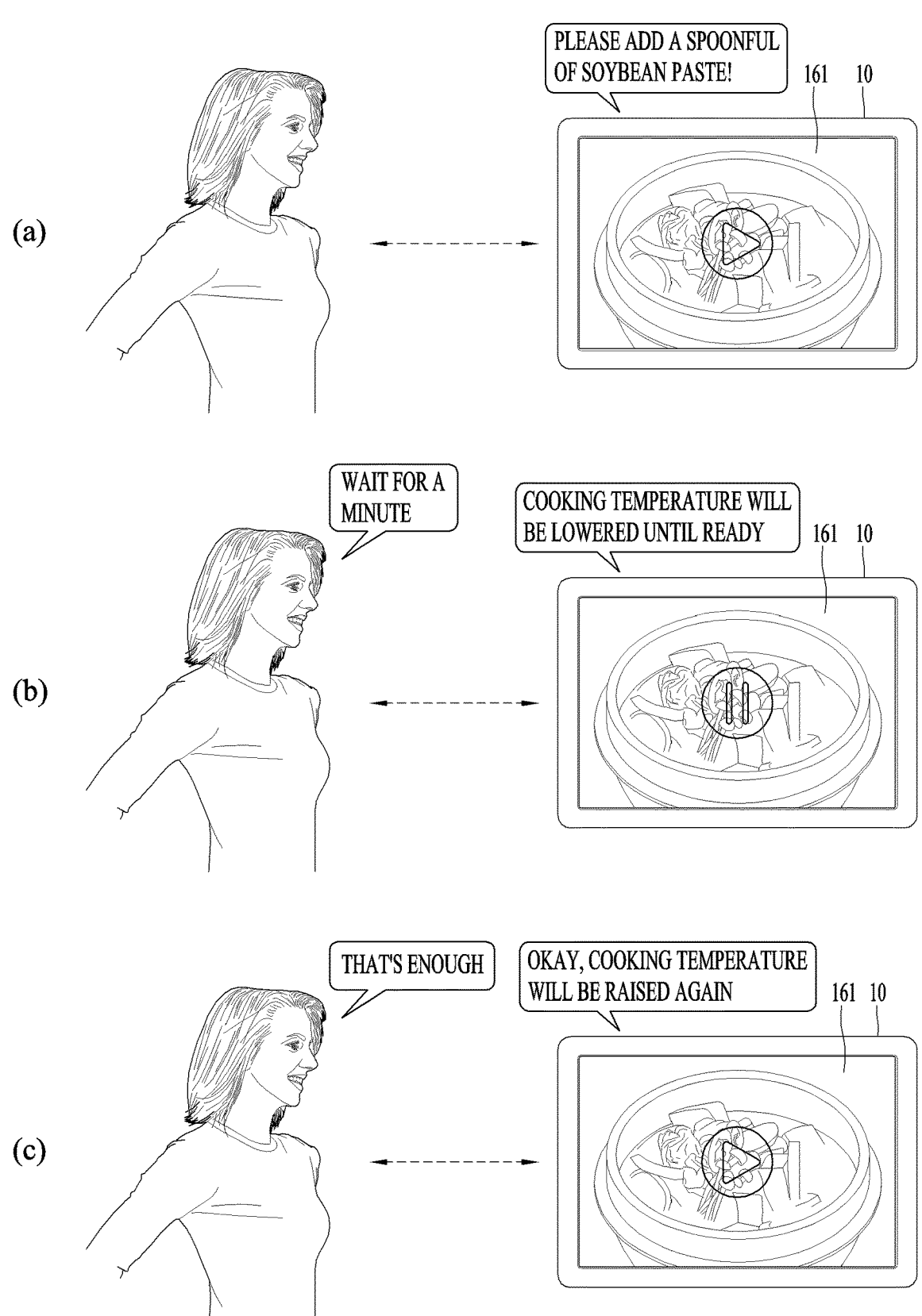
FIG. 4 is an exemplary view showing an example of controlling a progress of a cooking procedure according to a user's own cooking progress state when entering a user cooking process during the operation processes of FIG. 3.

FIG. 4 is an exemplary view showing an example of controlling a progress of a cooking procedure according to a user's own cooking progress state when entering a user cooking process during the operation processes of FIG. 3.

First, referring to (a) of FIG. 4, (a) of FIG. 4 shows an example in which a portion of recipe content corresponding to a cooking process that requests the user to drop ingredients is played back through the display 161. In this case, the controller 100 of the artificial intelligence device 10 may discriminate that a process of cooking food in the cooking apparatus is a process that requires the user's own cooking according to the playback state of the recipe content. For example, when voice information requesting the dropping of a specific ingredient is output, as shown in (a) of FIG. 4, the controller 100 may discriminate that a process requiring the user's own cooking has been entered based on the output of the voice information.

Therefore, the controller 100 may pause the playback of recipe content as shown in (b) of FIG. 4. Furthermore, in order to maintain the cooking standby temperature, the heating power level of the cooking apparatus may be lowered and notification information notifying the user of the lowering of the heating power level may be output. In this case, the notification information may be output through the audio output part 162 of the artificial intelligence device 10 in the form of voice information, as shown in (b) of FIG. 4.

In this state, the controller 100 may check whether to resume the playback of the recipe content through a conversational interaction with the user. That is, as shown in (c) of FIG. 4, when the user utters a voice command indicating that his or her own cooking process has been completed, the controller 100 may receive and analyze the user's voice command to recognize that the user has uttered a response indicating the completion of his or her own cooking process. Therefore, as shown in (c) of FIG. 4, the cooking temperature may be restored, and the recipe content that is output through the display 161 may be subsequently played back.

Meanwhile, according to the foregoing description, it has been described that the artificial intelligence device 10 according to an embodiment of the present disclosure retrieves a recipe for a specific food item and plays back the recipe content of the retrieved food item according to the user's request. However, when the user's request does not include information referring to a specific food item, the controller 100 may recommend at least one food item to the user based on a learning result for the identified user or a current state of food ingredients.

Figure 5:
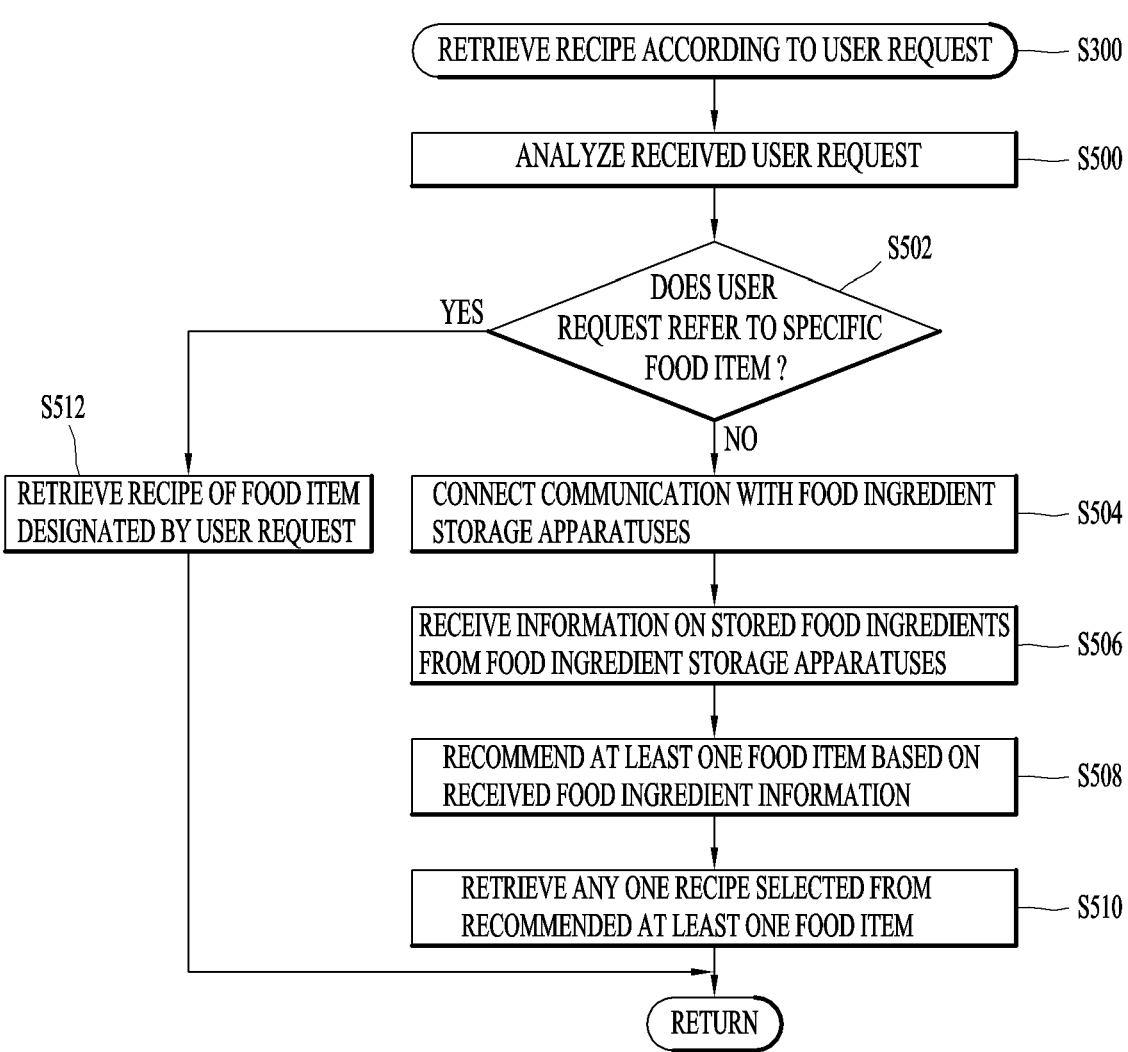
FIG. 5 is a flowchart showing an operation process of providing, by the artificial intelligence device according to an embodiment of the present disclosure, a recipe for a specific food item according to a result of analyzing a user's request.

FIG. 5 is a flowchart showing an operation process of providing, by the artificial intelligence device 10 as described above according to an embodiment of the present disclosure, a recipe for a specific food item according to a result of analyzing a user's request.

Referring to FIG. 5, when a user's request related to a recipe for a food item is received in the step S300 of FIG. 3, the controller 100 of the artificial intelligence device 10 according to an embodiment of the present disclosure may analyze the received request, for example, the user's voice command detected through the microphone 121 (e.g., natural language analysis) (S500). Furthermore, according to the analysis results, it may be discriminated whether the detected user's request refers to a specific food item (S502).

As an example, when the user's request received in the step S500 includes the name of a specific food item, the controller 100 may determine that the user has requested a recipe related to the specific food item. Then, the controller 100 may retrieve a recipe for the specific food item determined to have been requested by the user. Then, the process proceeds to the step S302 of FIG. 3 to perform a process subsequent to the step S302.

Alternatively, the controller 100 may discriminate whether the user's request received in the step S500 includes information related to a specific time point. Furthermore, when the user's request includes information on a specific time point, such as 'yesterday' or 'the eleventh day', the user's cooking history related to the specific time point may be retrieved. Furthermore, a food item designated by the user's request may be determined from the cooking history related to the specific time point to retrieve a recipe for the determined food item. Then, the process proceeds to the step S302 of FIG. 3 to perform a process subsequent to the step S302.

However, as a result of the discrimination in the step S502, when the user's request for cooking food does not include information referring to a specific food item, for example, 'Recommend delicious food!', the controller 100 may perform a communication connection to food ingredient storage apparatuses (S504). Furthermore, information related to the stored food ingredients (hereinafter referred to as food ingredient information) may be received from the food ingredient storage apparatuses connected through communication (S506). Here, the food ingredient information may include various information related to the food ingredients, including the remaining amounts of the food ingredients.

For example, the food ingredient storage apparatuses connected to the artificial intelligence device 10 in the step S504 may be electronic apparatuses that not only have a basic function of storing food ingredients, but also have various functions specialized for the food ingredients being stored. As an example, a food ingredient storage apparatus that can be connected to the artificial intelligence device 10, such as a kimchi refrigerator or a meat storage unit, may be an electronic apparatus specialized for storing a specific kind of food ingredient. In this case, the kimchi refrigerator may include a function of detecting the ripening state of stored kimchi products, as a function specialized for storing the kimchi products. To this end, the kimchi refrigerator may be provided with a ripeness sensor that can detect the ripening state of stored kimchi products, and may transmit food ingredient information, which further includes information on the ripening state of kimchi products detected as a result of the detection by the ripeness sensor, in addition to information on the remaining amounts of kimchi products, to the artificial intelligence device 10 in the step S506.

Alternatively, the meat storage unit may include a function specialized for meat storage, as a function for detecting the freshness of stored meat. To this end, the meat storage unit may be provided with a freshness sensor, such as an optical sensor, which can detect the freshness of stored meat, and may transmit food ingredient information, which further includes information on the freshness of meat products detected as a result of detection by the freshness sensor, in addition to information on the remaining amounts of meat products, to the artificial intelligence device 10 in the step S506.

Meanwhile, the artificial intelligence device 10 may generate a list of food items that can be cooked with currently stored food ingredients based on the food ingredient information received in the step S506. Furthermore, based on the generated list of food items, at least one food item may be recommended to the user as a recommended food item (S508).

In the step S508, the controller 100 of the artificial intelligence device 10 may detect food ingredients stored in the connected food ingredient storage apparatus based on the received food ingredient information. Furthermore, based on the recipes of food items stored in the memory 170, the controller 100 may detect food items in which all ingredients corresponding to the main ingredients of respective food items are stored in the food ingredient storage apparatus. That is, the controller 100 may detect food items that can be cooked with the food ingredients currently stored in the food ingredient storage apparatus, based on the food ingredients currently stored in the food ingredient storage apparatus and the main ingredients of respective food items according to the recipe. Furthermore, the list of detected food items may be output on the display 161 as a recommended food item list.

Meanwhile, the controller 100 may receive the user's selection for the recommended food item list that is output in the step S508. Furthermore, a recipe for a food item selected by the user from among the food items included in the recommended food list may be retrieved (S510). Furthermore, when a recipe for a specific food item is retrieved, a process subsequent to the step S300 of FIG. 3 may be carried out.

Meanwhile, the controller 100 may extract at least one food item that meets a preset condition from the food item list generated in the step S508 to output the extracted at least one food item as a recommended food item list. Here, the preset condition may be the user's preferred food taste learned according to the user's history of food items cooked through the artificial intelligence device 10. Alternatively, the preset condition may be a state of the food ingredients currently stored in each food ingredient storage apparatus.

Hereinafter, when at least one recommended food item is determined according to the learned user's preference food taste, an operation process of the controller 100 of the artificial intelligence device 10 according to an embodiment of the present disclosure will be described below in more detail with reference to FIG. 6. In addition, when at least one recommended food item is determined according to the state of the food ingredients stored in each food ingredient storage apparatus, an operation process of the controller 100 of the artificial intelligence device 10 according to an embodiment of the present disclosure will be described in more detail below with reference to FIG. 7.

First, FIG. 6 is a flowchart showing an operation process of recommending at least one food item to a user according to a result of learning the user's taste as described above.

Referring to FIG. 6, when the step S508 of FIG. 5 is carried out, the controller 100 of the artificial intelligence device 10 according to an embodiment of the present disclosure may first identify the user who has uttered a voice command (S600). Furthermore, customizing data stored for the identified user may be retrieved (S602).

Here, the customizing data refers to personalized data learned for the currently identified user, and may be data learned such as the kinds of food items and food ingredients preferred by the user. The customizing data is learned according to the user's history of food items cooked through the artificial intelligence device 10, which may be data learned such as the user's preferred food items, the user's preferred food kinds and food ingredients, depending on the food items the user has cooked so far and frequencies at which those foods have been cooked.

In other words, the controller 100 may learn food items that have been cooked more frequently so far as the user's preferred food items, and learn the preferred food kinds and food ingredients as the user's preferred food kinds and food ingredients. Therefore, the controller 100 may learn not only the user's preferred food items, but also the user's preferred food kinds (e.g., soup, stew, stir-fry, etc.) and food ingredients (e.g., pork, beef, fish, etc.). Furthermore, the user's customizing data may include information on the user's preferred food kinds and food ingredients, as well as the user's preferred food items determined according to the learning result.

Therefore, based on the customizing data retrieved in the step S602, the controller 100 may determine the user's preferred food types, that is, the user's preferred food kinds and food ingredients as well as the user's preferred food items identified by a currently received voice command (S604).

When the user's preferred food item and preferred food type are determined in the step S604, the controller 100 may detect food items that can currently be cooked based on the food ingredient information received from each food ingredient storage apparatus in the step S506 of FIG. 5 (S606). In this case, as described above, for the cookable food items, when all the food ingredients corresponding to the main ingredients of a food item according to the recipe stored in the memory 170 are stored in the food ingredient storage apparatus above predetermined amounts, the controller 100 may detect the food item corresponding to the recipe as a food item that can currently be cooked.

Here, the predetermined amounts may be determined according to an amount of food learned according to the user's history of food cooked through the artificial intelligence device 10. For example, when the user typically cooks food for 3 servings, the controller 100 may detect a food item corresponding to the recipe as a food item that can currently be cooked only when more than 3 servings of food ingredients corresponding to the main ingredients of the food item according to the recipe are stored. In this case, information on the learned amount of food may be information included in the identified user's customizing data.

Meanwhile, in the step S606, when a list of food items that can currently be cooked is detected, the controller 100 may recommend at least one food item from the list of food items that can be cooked based on the user preference food items and user preference food types determined in the step S604 (S608).

For example, in the step S608, the controller 100 may determine at least one food item from among the cookable food items as a recommended food item according to preset priorities. As an example, the controller 100 may set the user preference food items as the highest priority, and then set priorities in the order of food kinds and food ingredients.

Therefore, among the cookable food items, food items according to the user preference food items may be determined as recommended food items. Therefore, when at least one user preference food item is included among the cookable food items, the controller 100 may first extract food items corresponding to the at least one user preference food items. Furthermore, the controller 100 may extract at least one food item corresponding to the user's preferred food types based on the kinds and ingredients of respective food items included in respective recipes of the cookable food items.

Meanwhile, the controller 100 may determine recommended food items from food items extracted according to the user preference food items and food items extracted according to the user's preferred food types, respectively. As an example, when the limited number of recommended food items is 4, the controller 100 may determine two food items with high user preferences (high cooking frequencies) from among the food items extracted according to the user preference food items as the recommended food items. Additionally, the controller 100 may determine two food items having higher priorities (e.g., food items extracted according to preference food kinds) among the food items extracted according to the user's preferred food types as the recommended food items.

Furthermore, the controller 100 may output food items that are determined as the recommended food items on the display 161 (S610). Furthermore, the controller 100 may proceed to step S510 of FIG. 5 to receive the user's selection of any one of the output recommended food items, and retrieve a recipe for the selected any one recommended food items.

Meanwhile, unlike the foregoing description of FIG. 6, the controller 100 may, of course, provide at least one recommended food item to the user based on the state of each food ingredient currently stored in the food ingredient storage apparatus.

FIG. 7 is a flowchart showing an operation process of recommending at least one food item to a user according to the freshness of stored food ingredients.

Referring to FIG. 7, the controller 100 of the artificial intelligence device 10 according to an embodiment of the present disclosure may first check the freshness information of food ingredients based on the received food ingredient information (S700). Furthermore, based on the extracted freshness, the use priority of each food ingredient may be determined (S702).

For example, the controller 100 may determine the use priority based on the freshness of food ingredients whose freshness is above a predetermined level. In this case, for food ingredients whose freshness is below a predetermined level, it is determined that the food ingredients are spoiled, and notification information notifying the user that the ingredients are spoiled may be output.

Meanwhile, for food ingredients whose freshness is above a predetermined level, the controller 100 may set the use priority to be low as the freshness is high, and set the use priority to be high as the freshness is low. Furthermore, the controller 100 may detect food items that can be cooked with food ingredients with high use priorities based on the use priorities determined for respective food ingredients (S704).

In this case, as described above, for the cookable food items, when all the food ingredients corresponding to the main ingredients of a food item according to the recipe stored in the memory 170 are stored in the food ingredient storage apparatus above predetermined amounts, the controller 100 may detect the food item corresponding to the recipe as a food item that can currently be cooked. In this case, the controller 100 may detect food items including a food ingredient with the highest use priority as at least one of food ingredients corresponding to the main ingredients of the food item according to the recipe, as the cookable food items.

Furthermore, the controller 100 may output food items that are determined as the recommended food items on the display 161 (S706). Furthermore, the controller 100 may proceed to step S510 of FIG. 5 to receive the user's selection of any one of the output recommended food items, and retrieve a recipe for the selected any one recommended food items.

Meanwhile, in the step S702, it has been described as an example, in which the lower the freshness of the food ingredients, the higher the use priority is set, and the higher the freshness, the lower the use priority is set, but on the contrary, the higher the freshness of the food ingredients, the higher the use priority is set, and the lower the freshness, the lower the use priority may, of course, be set. In this case, the higher the use priority, the fresher the food ingredients, so the taste may be the best when cooking food.

Meanwhile, the controller 100 may set different use priorities according to freshness depending on the kinds of food ingredients. As an example, in the case of fresh products, such as meat, which taste best when consumed in a fresh state, in the food ingredient storage apparatus, the higher the freshness of the food ingredients, the higher the use priorities may be set, and the lower the freshness, the lower the use priorities may be set. On the contrary, in the case of food ingredients, such as salted seafood or kimchi products, which taste better when ripened to some extent, the lower the freshness of the food ingredients, the higher the use priorities may be set, and the higher the freshness, the lower the use priorities may be set. The use priority setting according to those food kinds may be set at the time of manufacturing the artificial intelligence device 10, or may be set according to the user's input to the artificial intelligence device 10.

As described above, the controller 100 of the artificial intelligence device 10 according to an embodiment of the present disclosure may recommend at least one food item determined according to the user's preferred food taste (preference food items or preference food types) or the storage state of the food ingredients to the user based on FIG. 6 or FIG. 7.

Here, the controller 100 may recommend recommended food items to the user based on either one of the user's preferred food taste or the storage state of food ingredients according to a preset method. For example, the controller

100 may recommend recommended food items according to either one of the user's preferred food taste or the storage state of food ingredients to the user based on use priorities determined for respective food ingredients in the step S702 of FIG. 7.

In this case, the controller 100 may discriminate whether a use priority having the highest value, among the use priorities determined for the respective food ingredients in the step S702 of FIG. 7, is above a preset value. Furthermore, when the use priority is above a preset value, recommended food items according to the storage state of the food ingredients may be recommended to the user in preference to recommended food items according to the user preference food taste. On the contrary, when the use priority having the highest value is below the preset value, recommended food items according to the user food preference taste may be provided to the user in preference to recommended food items according to the storage state of the food ingredients.

Meanwhile, in the foregoing description, it has been mentioned that the artificial intelligence device 10 according to an embodiment of the present disclosure may control cooking apparatuses according to the playback state of recipe content to carry out food cooking. Furthermore, a configuration in which during the playback of the recipe content, when entering a process requiring the user's own cooking, the playback of the recipe content is paused and heating power is adjusted to allow the cooking apparatus to maintain the cooking standby temperature has been described.

In this case, in the process requiring the user's own cooking, the artificial intelligence device 10 according to an embodiment of the present disclosure may further provide additional content related to the user's own cooking process according to the user's request. In this case, the additionally provided content may be provided to the user while the playback of the recipe content is paused. Hereinafter, FIGS. 8 and 9 show an operation process in which related content is additionally provided while playing back recipe content as described above, and an example thereof.

First, as described above, FIG. 8 is a flowchart showing an operation process of providing additional content (hereinafter referred to as related content) related to a user's own cooking process in the artificial intelligence device 10 according to an embodiment of the present disclosure. Here, the operation process shown in FIG. 8 may be an operation process corresponding to the step S312 of FIG. 3, which is performed while the playback of recipe content is paused, and the cooking standby temperature according to a current cooking state is maintained as the user's own cooking process is carried out in FIG. 3.

Figure 8:
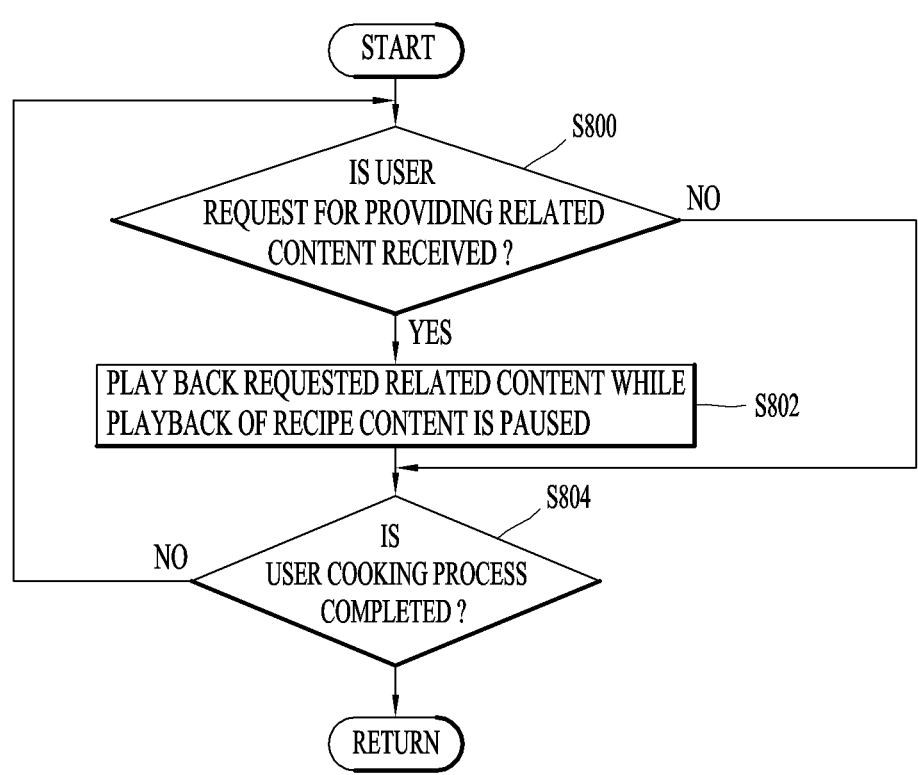
FIG. 8 is a flowchart showing an operation process of providing, by an artificial intelligence device according to an embodiment of the present disclosure, related content associated with a specific cooking process during cooking.
Figure 9:
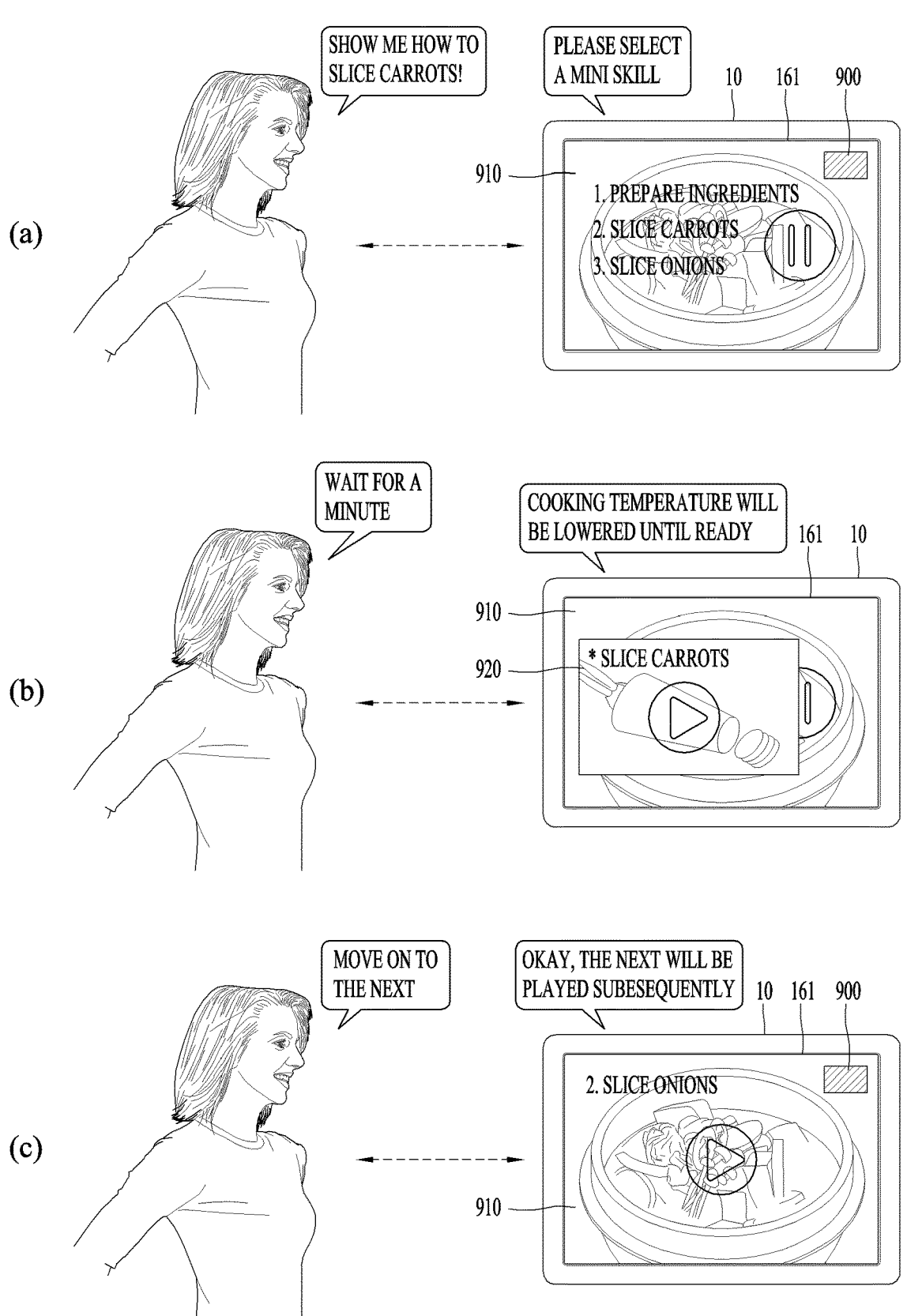
FIG. 9 is an exemplary view showing an example of providing related content associated with a specific cooking process during cooking according to the operation process of FIG. 8.

Referring to FIG. 8, in the step S310 of FIG. 3, while the playback of the recipe content is paused and the cooking apparatus is controlled to maintain the cooking standby temperature, the controller 100 may check whether there is the user's request for providing related content (S800). Here, the user request may be received through the user's touch input or the user's voice command applied to one area of the display 161.

When there is the user's request for related content as a result of the check in the step S800, the controller 100 may play back the related content according to the user's request while the recipe content is paused (S802). In this case, the controller 100 may output a playback screen of the related content on at least part of a screen on which the recipe content is played back.

Meanwhile, when the related content is played back, the controller 100 may check whether the user cooking process in which the user's own cooking is performed has been completed (S804). As an example, the controller 100 may determine that the user cooking process has been completed when a voice command indicating that the user's own cooking process has been completed or a voice command requesting to proceed to a next process is received from the user.

As a result of the check in the step S804, when the user cooking process is completed, the controller 100 may proceed to step S314 in FIG. 3 to resume the playback of the recipe content maintained in a pause state, and restore the cooking temperature to resume the cooking of food according to the recipe content played back subsequent to the pause time point. Furthermore, a process subsequent to the step S314 in FIG. 3 may be subsequently carried out.

Meanwhile, as a result of the check in the step S804, when the user cooking process is not completed, the controller 100 may proceed again to step S800 to check whether a user request for providing related content has been received. Furthermore, when the user's request for providing related content is received again, the controller 100 may proceed to step S802 to play back the selected related content and perform a process subsequent thereto. However, when the user's request related to the playback of related content is not received in the step S800, the controller 100 may proceed to step S804 to check whether the user's cooking process has been completed, and according to the check result, the controller 100 may proceed to step S314 in FIG. 3 or proceed again to step S800 in FIG. 8 to determine whether there is the user's request for providing related content.

FIG. 9 is an exemplary view showing an example of providing related content associated with a specific cooking process during cooking according to the operation process of FIG. 8.

Referring to FIG. 9, when a process requiring the user's own cooking, such as a process of preparing and dropping ingredients, is played back while playing back recipe content, the controller 100 of the artificial intelligence device 10 according to an embodiment of the present disclosure may determine that the food cooking process has entered the user cooking process in the step S308 of FIG. 3. In this case, the controller 100 may inform the user that the user's own cooking is required by outputting a message requesting the user's own cooking.

Meanwhile, as described above, the present disclosure controls the cooking apparatus (e.g., heating power control) to cook food according to the played-back recipe content at the same time as playing back the recipe content by the artificial intelligence device 10. Therefore, when entering a process requiring the user's own cooking, the heating power may be controlled to maintain the cooking standby temperature determined by a current cooking temperature so as to prevent food being cooked from being heated or cooled more than necessary due to a time period required for the user's own cooking. In addition, the controller 100 may maintain the played-back recipe content in a pause state during the time period required for the user's own cooking.

In this manner, while the recipe content is maintained in a pause state, and the controller 100 may detect the user's request for content related to the currently requested user's own cooking process. That is, as shown in (a) of FIG. 9, while the recipe content is paused, the user may request content related to how to prepare an additional ingredient to be dropped into the food, that is, 'carrot' (step S800 in FIG. 8).

Here, the user's request for related content may be requested through a voice command, as shown in (a) of FIG. 9. Alternatively, the user may select the playback of the related content by selecting a graphic object 900 corresponding to the related content, as shown in (a) of FIG. 9. In this case, the graphic object 900 may be displayed in one area of a screen of the display 161 on which recipe content is displayed. Here, the graphic object 900 may be displayed when the user's own cooking is required, and displayed only when the playback state of the recipe content is maintained in a pause state as the user's own cooking process is carried out.

Meanwhile, when the user's request for the related content is detected, the controller 100 may play back the related content on the display 161 in response to the user's request. In this case, the related content may be displayed in an area corresponding to at least part of the playback screen of the recipe content that is in a pause state, as shown in (b) of FIG. 9.

As an example, when the playback of the related content is selected, the controller 100 may form a second layer that is distinct from a first layer on which the recipe content is output, and may output the second layer to cover at least part of the first layer. Furthermore, the related content may be played back on the second layer.

Furthermore, as shown in (c) of FIG. 9, when related content is played back, the controller 100 may receive a voice command from the user requesting to proceed to a next process. Furthermore, when the user receives the next process, that is, a voice command indicating that the user's own cooking has been completed or a voice command requesting to proceed to the next process, the controller 100 may determine that the user's own cooking process is completed and subsequently play back the content of the recipe from the paused time point.

In this case, when the next process is a process that does not require the user's own cooking, the controller 100 may resume the playback of the recipe content again and control the cooking apparatus to cook the food according to the playback state of the recipe content. However, when the next process is also a process that requires the user's own cooking, as shown in (a) and (b) of FIG. 9, the playback state of the recipe content may be maintained in a pause state to play back related content according to the user's request.

Meanwhile, the foregoing description has described a process in which the artificial intelligence device 10 according to an embodiment of the present disclosure is connected to a cooking apparatus that cooks food, such as an induction cooker or oven, to cook food according to the playback state of the recipe content, but the present disclosure is not, of course, limited thereto. For example, the artificial intelligence device 10 according to an embodiment of the present disclosure may be connected to an apparatus, such as a grain dispenser, which discharges predetermined amounts of food ingredients to cook a specific food item. Furthermore, predetermined amounts of food ingredients may be discharged according to the identified user's customizing data.

Figure 10:
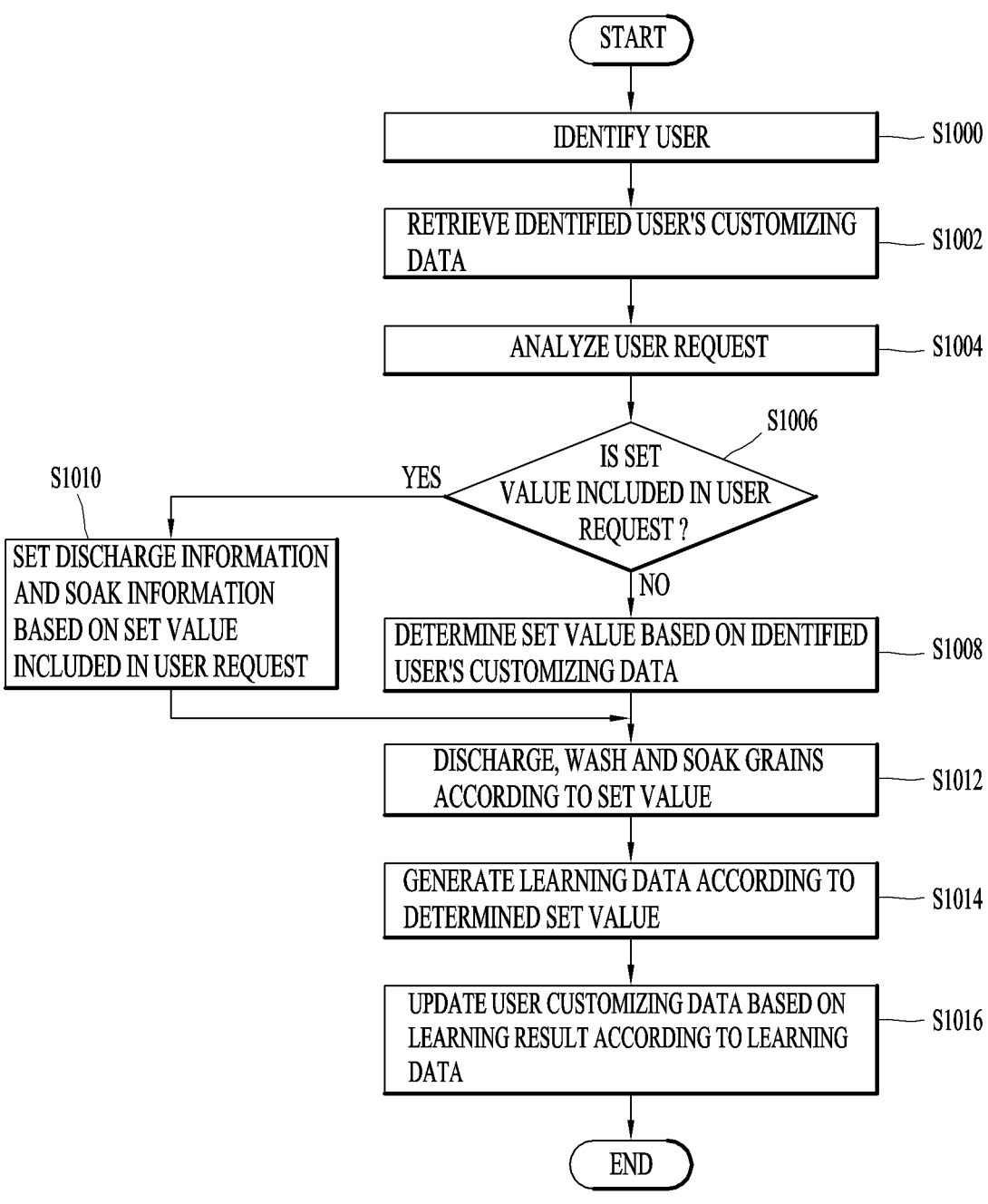
FIG. 10 is a flowchart showing an operation process of controlling, by an artificial intelligence device according to an embodiment of the present disclosure, a grain dispenser to discharge and soak grains based on a result learned from a user.

FIG. 10 is a flowchart showing an operation process in which the artificial intelligence device 10 is connected to the grain dispenser according to an embodiment of the present disclosure as described above to control the grain dispenser to discharge and soak grains according to user customizing data Referring to FIG. 10, when a user's request for grain discharge for cooking rice is received, the controller 100 of the artificial intelligence device 10 according to an embodiment of the present disclosure may identify the user from the user's request (S1000). As an example, the controller 100 may identify the user corresponding to the received grain discharge request based on a voice of the user who has uttered the user's request, or an image of the user who has uttered a voice command corresponding to the user's request.

Then, the controller 100 may retrieve customizing data corresponding to the identified user (S1002). Furthermore, the controller 100 may analyze the user's request (S1004) to discriminate whether the user's request includes a set value for grain discharge (S1006). Here, the set value for grain discharge, which is a set value necessary for discharging grains, may be information on which grains will be discharged (grains to be discharged), how much grains will be discharged (total grain discharge amount), and how to discharge (mixing ratio of grains).

In this case, when there are names for specific grains other than rice designated in the user's request, the controller 100 may determine that the user has requested the discharge of the designated grains. However, when the names of specific grains are not included in the user's request, the controller 100 may detect whether the user's request includes a specific time point when the grains have been discharged. In addition, when the user's request includes a specific time point at which grains have been discharged, specific grains to be mixed with rice may be determined from a grain discharge history at the specific time point.

Meanwhile, the grain discharge amount and grain mixing ratio may also be determined in a similar manner thereto. For example, when the user's request includes information on an amount of rice (e.g., 2 servings) or a grain mixing ratio, the controller 100 may determine a grain discharge amount or grain mixing ratio according to the designated amount of rice or grain mixing ratio. Alternatively, when the user's request includes information on a specific time point at which grains have been discharged, the controller 100 may determine a grain discharge amount or grain mixing ratio from the grain discharge history at the specific time point (S1010).

However, as a result of the discrimination in the step S1006, when the received user request does not include a set value (designated value or specific time point) for grain discharge, the controller 100 may determine a set value for the grain discharge based on user customizing data retrieved in the step S1002. That is, when the set value is not included in the user's request, the controller 100 may determine kinds of grains and grain discharge amounts preferred by the user based on the history of grain discharge according to the user's request, and a set value for the grain discharge based on a result of learning preferred grain mixing ratios by the artificial intelligence part 180 (S1008).

Meanwhile, based on the step S1008 or step S1010, when the set value for grain discharge (kinds of discharge grains, grain discharge amount, and grain mixing ratio) is determined, the controller 100 may control the grain dispenser to discharge grains according to the determined set value. Then, the grain dispenser may be controlled to wash the discharged grains and soak the washed grains in a preset amount of rice water (S1014).

Furthermore, the controller 100 may generate learning data according to the determined set value (S1014). The step S1014 may be a process of generating the set value determined in the step S1008 or step S1010 as learning data having a preset format. Furthermore, when learning data is generated through the process of the step S1014, the controller 100 may input the generated learning data to the artificial intelligence part 180 to allow the artificial intelligence part 180 to perform learning according to the set value determined in the step S1008 or step S1010.

Then, according to the input of the controller 100, the artificial intelligence part 180 may perform learning based on the set value determined in the step S1008 or step S1010, and update the customizing data of the identified user according to the performed learning result. (S1016).

Meanwhile, as described above, it has been mentioned that the artificial intelligence device 10 according to an embodiment of the present disclosure may receive food ingredient information from each connected food ingredient storage apparatus. Here, the food ingredient information may include information on the remaining amounts of food ingredients stored in each food ingredient storage apparatus. Therefore, the controller 100 of the artificial intelligence device 10 may detect food ingredients with insufficient remaining amounts based on the remaining amounts of the food ingredients and request the user whether to purchase the detected food ingredients.

Figure 11:
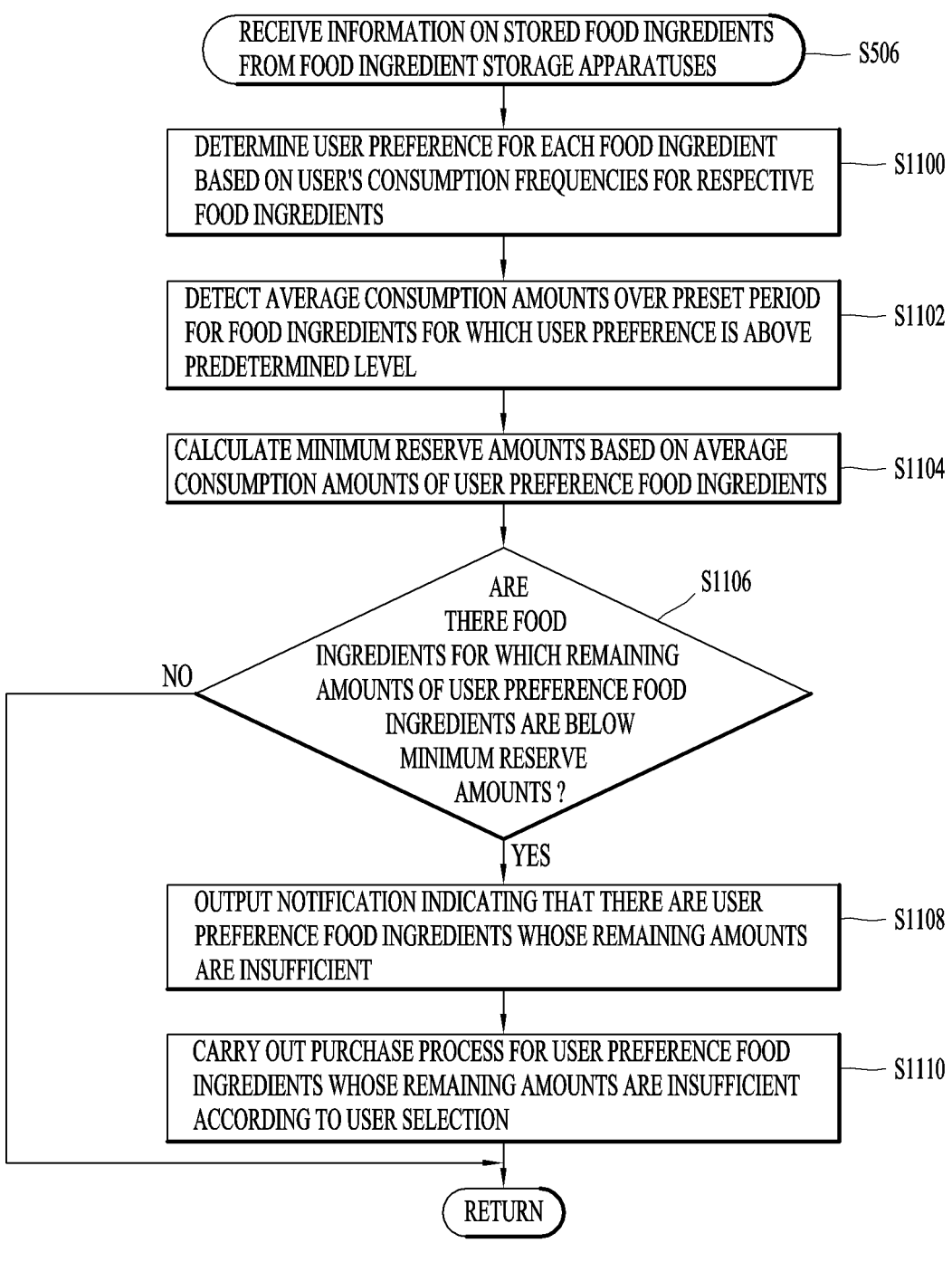
FIG. 11 is a flowchart showing an operation process of purchasing, by an artificial intelligence device according to an embodiment of the present disclosure, food ingredients with insufficient remaining amounts based on the detected storage amounts of food ingredients.

FIG. 11 is a flowchart showing an operation process of purchasing, by the artificial intelligence device 10 as described above according to an embodiment of the present disclosure, food ingredients with insufficient remaining amounts based on the detected storage amounts of food ingredients.

Referring to FIG. 11, when food ingredient information is received, the controller 100 of the artificial intelligence device 10 may detect a use frequency for each food ingredient by a user. Furthermore, based on the detected use frequencies of food ingredients, the user's preferences for the food ingredients may be determined (S1100). In this case, food ingredients having use frequencies above a predetermined level may be food ingredients having high user preferences, that is, user preference food ingredients.

When the user's preference for each food ingredient is determined in the step S1100, the controller 100 may detect average consumption amounts over a preset period for the food ingredients for which the determined user preferences are above a predetermined level (S1102). That is, with respect to food ingredients frequently used by the user, the controller 100 may calculate an average consumption amount for each use frequency for each food ingredient during a preset period, based on an amount of the food ingredient used by the user and a frequency at which the food ingredient has been used during the preset period.

Meanwhile, the controller 100 may determine a minimum reserve amount for each food ingredient based on the average consumption amount of each food ingredient preferred by the user in the step S1102 (S1104). In this case, the controller 100 may determine the average consumption amount as a minimum reserve amount, or may determine a minimum reserve amount for the food ingredient by adding a preset margin amount to the average consumption amount.

Here, the preset margin amount may be determined differently for each food ingredient. For example, in the case of a food ingredient with a large average consumption amount, the margin amount may have a large value. On the contrary, in the case of a food ingredient with a small average consumption amount, the margin amount may have a small value. As an example, the preset margin amount may be determined as a multiple of the average consumption amount.

In the step S1104, when minimum reserve amounts are determined for food ingredients whose user preference is above a predetermined level, the controller 100 may compare the calculated minimum reserve amounts for respective food ingredients with the remaining amounts of the user preference food ingredients stored in each food ingredient storage apparatus (S1106). Furthermore, among the user preference food ingredients stored in the food ingredient storage apparatus, it may be detected whether there are any food ingredients whose remaining amount is less than the calculated minimum reserve amount. Additionally, when there are no user preference food ingredients whose remaining amount is less than the minimum reserve amount, a purchase process for the food ingredients may not carried out.

On the contrary, as a result of the detection in the step S1106, when there are user preference food ingredients whose remaining amount is less than the minimum reserve amount, the controller 100 may output notification information indicating that there are food ingredients whose remaining amounts are insufficient (S1108). In this case, the notification information may include a query to the user for checking whether to purchase food ingredients with insufficient remaining amounts.

Meanwhile, in response to the notification information, when the user selects to purchase the food ingredients with insufficient remaining quantity, the controller 100 may carry out a purchase process of the grains (grains with insufficient remaining amounts) (S1110). In this case, the controller 100 may execute a built-in purchase application to carry out an order and payment process for the food ingredients (user preference food ingredients whose remaining amount is less than the minimum reserve amount) according to the user's voice input. Alternatively, the controller 100 may access a preset external terminal through a short-range communication module, and provide the external terminal with information on specific food ingredients (user preference food ingredients whose remaining amount is less than the minimum reserve amount) and retrieval information on online stores where the specific food ingredients can be purchased, thereby allowing the user to purchase the specific food ingredients through the external terminal. In this case, the external terminal may be the user's mobile terminal or computer.

Meanwhile, the foregoing process of FIG. 11 may be carried out in the process S506 of FIG. 5 in which food ingredient information is received from connected food ingredient storage apparatuses for food recipe recommendation. In this case, subsequent to carrying out a process of purchasing the user preference food ingredients with insufficient remaining amounts, the controller 100 may detect cookable food items based on food ingredient information received from respective food storage apparatuses and provide at least one of the detected food items as a recommended food item. However, the present disclosure is not, of course, limited thereto.

That is, the process of FIG. 11 may not be limited to the step S506 in FIG. 5, and furthermore, when at least one food ingredient storage apparatus is connected to the artificial intelligence device 10 at the user's request, or the like, it may be carried out as a separate process from the process of recommending food items that can be cooked (e.g., step S506 in FIG. 5).

The foregoing present disclosure may be implemented as computer-readable codes on a program-recorded medium. The computer-readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and also include a device implemented in the form of a carrier wave (for example, transmission via the Internet). The above detailed description is therefore to be construed in all aspects as illustrative and not restrictive. The scope of the present disclosure should be determined by reasonable interpretation of the appended claims and all changes that come within the equivalent scope of the present disclosure are included in the scope of the present disclosure.

The invention claimed is:

1. A smart home cooking system, the system comprising:
at least one cooking apparatus configured to cook food ingredients; and
an artificial intelligence device configured to identify a user's voice command and control the cooking apparatus to cook food ingredients according to the identified voice command, learn the user's preference food items and the user's preference food types according to the user's food cooking history, and detect, when there is a request from the user, at least one food recipe according to the user's preferred food items or the user's preference types from among a plurality of pre-stored recipes based on the learned result, and provide the detected at least one food recipe as a recommended food recipe to the user,
wherein,
the smart home cooking system further comprises a storage apparatus that stores the food ingredients,
the artificial intelligence device extracts cookable food items based on the food ingredients when the food ingredients are stored in the storage apparatus above predetermined amounts, and
the predetermined amounts are determined according to an amount of food learned according to the user's food cooking history.

2. The system of claim 1, wherein the artificial intelligence device detects at least one food item cooked at a preset frequency or higher according to the user's food cooking history to learn the user's preferred food item, and learns the user's preferred food type based on the kinds and ingredients of the food item cooked at the preset frequency or higher.

3. The system of claim 1,
wherein the artificial intelligence device establishes a communication connection to the storage apparatus, and detects at least one of the plurality of recipes by further reflecting food ingredient information received from the storage apparatus through the communication connection, and provides the detected at least one recipe as the recommended food recipe to the user.

4. The system of claim 3, wherein the food ingredient information comprises the remaining amount information of food ingredients contained in the storage apparatus, and
wherein the artificial intelligence device extracts the cookable food items from among food items corresponding to the plurality of recipes based on the remaining amount information of the food ingredients, and provides the recipe of at least one of the extracted food items as the recommended food recipe to the user.

5. The system of claim 3, wherein the artificial intelligence device notifies the user of notification information that the remaining amounts of the food ingredients are insufficient when the remaining amount information of the food ingredients is below preset minimum reserve amounts, and proceeds with, when a selection is made by the user, a purchase process for purchasing the food ingredients.

6. The system of claim 5, wherein the artificial intelligence device calculates average consumption amounts according to use frequencies of the food ingredients during a preset period, and calculates the minimum reserve amounts by adding preset margin values to the calculated average consumption amounts.

7. The system of claim 5, wherein the artificial intelligence device detects preference food ingredients preferred by the user according to frequencies of use from among food ingredients stored in the storage apparatus, and discriminates whether there are shortages by comparing the remaining amounts and the minimum reserve amounts only for the detected preference food ingredients.

8. The system of claim 1, wherein the storage apparatus further comprises a sensor that detects the ripening state or freshness of the food ingredients, and transmits food ingredient information including the ripening state or freshness of the food ingredients according to the detection result of the sensor to the artificial intelligence device.

9. The system of claim 8, wherein the artificial intelligence device sets, depending on the kinds of stored food ingredients, different use priorities corresponding to the ripening state or freshness of the food ingredients included in the ingredient information, detects at least one of the plurality of recipes based on the use priorities, and provides the detected at least one recipe as the recommended food recipe.

10. An artificial intelligence device included in a smart home cooking system, the artificial intelligence device comprising:

a communication part that performs a communication connection to at least one cooking apparatus;

a memory that stores a plurality of recipes stored in a reproducible form, customizing data including a user's preference food items and the user's preference food types learned according to the user's food cooking history, and control information for controlling the cooking apparatus;

an input part comprising a microphone for receiving the user's voice command;

a display that outputs any one recipe selected from among the plurality of recipes;

an artificial intelligence part that learns the user's preference food items and the user's preference food types according to the user's food cooking history; and a controller that retrieves any one of the plurality of recipes based on the user's customizing data identified through the voice command, controls the display to play back the retrieved recipe, and transmits a control signal according to the playback state of the recipe to the cooking apparatus to control the cooking apparatus so as to cook food according to the playback state of the recipe.

11. The system of claim 10, wherein the controller, while playing back the recipe, pauses the playback of the recipe when a process requiring the user's own cooking is played back, and lowers a heating power level at which the food is heated by the cooking apparatus so as to maintain a cooking standby temperature according to the cooking state of the food until the user's own cooking is completed.

12. The system of claim 11, wherein the cooking standby temperature is a temperature lower than the temperature at which the food is cooked by a preset level or more, and wherein the heating power level lowered for the cooking standby temperature increases as the temperature at which the food is cooked increases.

13. The system of claim 11, wherein the controller, while playing back the recipe, detects a user's request for the playback of additional content related to the user's own cooking when a process requiring the user's own cooking is played back, and plays back, when there is a request from the user, the additional content on at least part of the display while maintaining the playback of the recipe in a paused state.

14. The system of claim 13, wherein the controller displays a graphic object corresponding to the additional content in an area on the display when the playback of the recipe is in a paused state, and determines that there is the user's request for the playback of the additional content when the user's input is applied to the graphic object.

15. The system of claim 11, wherein the controller discriminates whether the process requiring the user's own cooking has been completed through a conversational interaction with the user, and subsequently plays back the paused recipe when the process requiring the user's own cooking is completed, and restores the heating power level of the cooking apparatus controlled according to the cooking standby temperature.

16. The system of claim 10, wherein the recipe is video content or slide-type content in which images showing cooking details for each process of cooking food are sequentially output one by one as a time period designated for each image elapses.

17. The system of claim 10, wherein the communication part further comprises an Internet module that performs a communication connection to a preset external server, and wherein the controller retrieves a recipe according to the user's request from the external server, and adds the retrieved recipe to a plurality of pre-stored recipes.

18. A method of controlling an artificial intelligence device provided in a smart home cooking system, the method comprising:

retrieving a recipe according to a user's request from among a plurality of recipes stored in a reproducible form;

connecting communication with any one cooking apparatus capable of cooking food according to the retrieved recipe from among at least one cooking apparatus included in the smart home cooking system;

playing back the retrieved recipe;

controlling the communication-connected cooking apparatus to cook the food according to the playback state of the recipe;

pausing, while playing back the recipe, the playback of the recipe when a process requiring the user's own cooking is played back, and lowering a heating power level at which the food is heated by the cooking apparatus so as to maintain a cooking standby temperature according to the cooking state of the food until the user's own cooking is completed; and subsequently playing back the paused recipe when the process requiring the user's own cooking is completed, and restoring the heating power level of the cooking apparatus controlled according to the cooking standby temperature, wherein whether the process requiring the user's own cooking is completed is discriminated through a conversational interaction with the user.

19. The method of claim 18, wherein the recipe according to the user's request is a recipe for at least one food item determined based on the user's preference food items and the user's preference food types learned according to the user's food cooking history.

* * * * *